(12) United States Patent
Ribeiro Ruiz et al.

(10) Patent No.: US 12,185,806 B2
(45) Date of Patent: Jan. 7, 2025

(54) PORTABLE LUNCHBOX

(71) Applicant: Nexenic AG, Winterthur (CH)

(72) Inventors: Claudio Ribeiro Ruiz, Zizers (CH); Reto Muhl, Büttenhardt (CH)

(73) Assignee: Nexenic AG, Winterthur (CH)

( * ) Notice: Subject to any disclaimer, the term of this patent is extended or adjusted under 35 U.S.C. 154(b) by 923 days.

(21) Appl. No.: 17/278,364

(22) PCT Filed: Sep. 25, 2019

(86) PCT No.: PCT/EP2019/075885
§ 371 (c)(1),
(2) Date: Mar. 22, 2021

(87) PCT Pub. No.: WO2020/064848
PCT Pub. Date: Apr. 2, 2020

(65) Prior Publication Data
US 2021/0345743 A1    Nov. 11, 2021

(30) Foreign Application Priority Data
Sep. 28, 2018 (EP) .................................. 18197440

(51) Int. Cl.
*A45C 11/20* (2006.01)
*A45C 13/00* (2006.01)
(Continued)

(52) U.S. Cl.
CPC ............ *A45C 11/20* (2013.01); *A45C 13/008* (2013.01); *A45C 13/02* (2013.01); *A45C 13/10* (2013.01);
(Continued)

(58) Field of Classification Search
CPC ..... A47J 36/32; A47J 36/2483; H05B 1/0202; H05B 1/0258; H05B 2203/02;
(Continued)

(56) References Cited

U.S. PATENT DOCUMENTS

| | | | | |
|---|---|---|---|---|
| 6,144,016 A * | 11/2000 | Garvin | ...................... | F24C 7/10 |
| | | | | 220/523 |
| 6,462,312 B1 * | 10/2002 | Feagley | ................... | A47J 27/17 |
| | | | | 219/536 |
| 6,541,738 B1 * | 4/2003 | Casasola | ................ | A45C 11/20 |
| | | | | 219/428 |
| 6,658,857 B1 * | 12/2003 | George | ................. | F25D 23/066 |
| | | | | 165/122 |
| 6,947,664 B1 * | 9/2005 | Yeh | ......................... | A47J 47/14 |
| | | | | 219/401 |
| 2014/0261381 A1 | 9/2014 | Ra | | |

(Continued)

FOREIGN PATENT DOCUMENTS

| | | |
|---|---|---|
| CH | 712870 A2 | 3/2018 |
| CN | 105661832 A | 6/2016 |

(Continued)

OTHER PUBLICATIONS

International Search Report of PCT/EP2019/075885 dated Dec. 19, 2019 [PCT/ISA/210].

*Primary Examiner* — Brian W Jennison
(74) *Attorney, Agent, or Firm* — Sughrue Mion, PLLC

(57) ABSTRACT

A portable lunchbox (1) for storing, transporting and preparing food, comprising a food cavity (10) for receiving food; a heating cavity (20) for receiving water; a heating element (80) for heating water in the heating cavity (20); a switch device (50) which can be switched from a first state to a second state; wherein the lunchbox (1) is designed in the first state of the switch device (50) to heat food arranged in the food cavity (10), and in the second state of the switch device (50) to steam food arranged in the food cavity (10). This lunchbox enables various kinds of meals preparation in a simple manner.

25 Claims, 15 Drawing Sheets

(51) Int. Cl.
  *A45C 13/02*   (2006.01)
  *A45C 13/10*   (2006.01)
  *A47J 36/24*   (2006.01)
  *A47J 36/32*   (2006.01)
  *H05B 1/02*    (2006.01)

(52) U.S. Cl.
  CPC ........... *A47J 36/2483* (2013.01); *A47J 36/32* (2013.01); *H05B 1/0202* (2013.01); *H05B 1/0258* (2013.01); *H05B 2203/021* (2013.01)

(58) Field of Classification Search
  CPC ....... A45C 13/10; A45C 13/02; A45C 13/008; A45C 11/20; B65D 81/3476
  See application file for complete search history.

(56) References Cited

U.S. PATENT DOCUMENTS

| | | | | |
|---|---|---|---|---|
| 2016/0045054 A1* | 2/2016 | Su | ........................... | A47J 47/14 |
| | | | | 99/403 |
| 2018/0317693 A1* | 11/2018 | Huang | ..................... | A23L 5/17 |

FOREIGN PATENT DOCUMENTS

| | | | |
|---|---|---|---|
| CN | 105877474 | A | 8/2016 |
| CN | 206699654 | U | 12/2017 |
| CN | 107692815 | A | 2/2018 |
| JP | 2015-217158 | A | 12/2015 |
| KR | 10-0822383 | B1 | 4/2008 |
| WO | 03/101268 | A1 | 12/2003 |
| WO | 2010/082762 | A2 | 7/2010 |
| WO | 2015/177726 | A1 | 11/2015 |

\* cited by examiner

PORTABLE LUNCHBOX

CROSS REFERENCE TO RELATED APPLICATIONS

This application is a National Stage of International Application No. PCT/EP2019/075885 filed on Sep. 25, 2019, claiming priority based on European Patent Application No. 18 197 440.3 filed on Sep. 28, 2018.

TECHNICAL FIELD

The present invention relates to the field of portable lunchboxes for storing, transporting and preparing food.

PRIOR ART

In today's business world, but also during the period of education, it is increasingly difficult to eat healthily during the day. Restaurants are often overcrowded and expensive, canteens rarely offer tasty food, and snack stands usually offer unhealthy food. There is thus a need to be able to easily prepare food brought from home. This need is even more pronounced if the employer does not offer a kitchen or at most only a microwave oven.

Therefore, lunchboxes are known in the prior art that allow meals brought from home to be heated on site.

WO 2015/177726 A1 describes a lunchbox comprising a top shell and a bottom shell, which are hinged together and can be closed against each other. In the bottom shell there is arranged a tray with an associated heating element, by means of which food located in the tray can be heated. When the top shell is closed, a seal is arranged between the top shell and the tray.

CH 712870 A2 describes a container for transporting and heating food, comprising a main part and a lid that can be placed on it to form a seal. The container contains a receptacle which has its own lid and which can be heated by heating elements arranged in the main part.

US 2016/0045054 A1 describes a cooking container having an outer body with a heating cavity into which water and a heating element are introduced. Above the heating cavity, an inner body is arranged in the outer body. The water in the heating cavity is heated, thereby heating the inner body arranged above it and food located therein. The heating cavity and the interior of the inner body are not connected to each other.

Most devices according to the prior art, however, only allow meals to be heated. In addition, steamers are known, but they are relatively complicated in design and correspondingly heavy and expensive.

DISCLOSURE OF THE INVENTION

It is therefore desirable to create a lunchbox which enables selectable preparation of meals.

The portable lunchbox for storing, transporting and preparing food according to the invention has a food cavity for receiving food, a heating cavity for receiving water, a heating element for heating water in the heating cavity, and a switch device which can be switched from a first state to a second state. The lunchbox is designed to heat food disposed in the food cavity in the first state of the switch device, and to steam food disposed in the food cavity in the second state of the switch device.

In preferred embodiments, the first state of the switch device also serves to sufficiently seal the lunchbox and in particular the food container for transport.

In this text, the term "preparation" is basically understood to mean the heating of an already finished meal. In principle, a meal can be heated by applying heat, either by means of pure heat transfer and/or by applying steam, for example water vapour. In an extended sense, the term "preparation" is also understood here to mean boiling, also cooking, of food, for example simmering of potatoes or vegetables. Some of the embodiments according to the invention only allow heating of the meals; other embodiments additionally allow a boiling or cooking of food.

Steaming is an increasingly popular preparation method, not only because of its health benefits. Using a steamer, meals can be reheated or, with a longer energy supply, also cooked. This type of preparation is usually called steam cooking. The advantage of heating with a steamer is, in particular, that the meals don't dry out.

Thanks to the lunchbox according to the invention, the user can choose the preparation method depending on the contents of the lunchbox. If on one day he brings along an already ready prepared meal, he can simply heat it up. If he brings food with him on another day that still needs to be cooked, he can also do this with the same lunchbox. Furthermore, he can preheat the same food first and then steam it, or vice versa. All he has to do is press the switch device. Purchased containers containing prepared meals can also be used in the lunchbox according to the invention.

The user can thus use the same lunchbox to transport, store and prepare food for consumption. Preferably, there is a seal that seals to the outside in each of these situations so that no liquid or odours can escape to the outside. This is particularly advantageous when the lunchbox is stored and activated directly at the workplace, for example in an open-plan office.

Preferably, the heating and, if necessary, also the cooking is done by means of water, which is filled into a corresponding cavity. This can be done before transport or immediately before the meals are prepared.

In preferred embodiments, the lunchbox has a fluidic connection between the heating cavity and the food cavity, which is designed to be opened and closed by the switch device. In the following, the fluidic connection will be referred to as a gas connection. It comprises connections which allow at least steam to pass through.

The lunchbox is preferably designed in such a way that the switch device closes the gas connection in the first state, so that in particular no water vapour can enter the food cavity from the heating cavity. Thus, when water present in the heating cavity is heated, only heat can be exchanged to the food cavity, so that food arranged in the food cavity is only heated. In preferred embodiments, this state also corresponds to the state in which the lunchbox with the meals can be transported and stored, even if the water for heating the meals has already been filled into the lunchbox; i.e. the lunchbox is ready for use. Preferably, in this state, there is a tight seal to the outside, which prevents contents and odours from leaking out.

The lunchbox is preferably designed in such a way that the switch device opens the gas connection in the second state, so that in particular water vapour can pass from the heating cavity into the food cavity. When the water in the heating cavity is now heated and water vapour is thus produced, it can enter the food cavity so that the food in the food cavity is steamed.

The heating element is preferably arranged on the heating cavity. In preferred embodiments, the bottom of the heating cavity is designed in such a way that, at least in an intended use position of the lunchbox, water in the heating cavity always flows to the heating element. The heating cavity preferably has a sloping bottom. If the heating element is arranged centrally in a bottom of the heating cavity, the food is heated as evenly as possible. The heating element is preferably planar towards the heating cavity.

In preferred embodiments, the heating element is electrically operable and the lunchbox has a battery which supplies power to the heating element.

Preferably, a power connection is provided, through which the battery can be charged. The power connection is preferably compatible with common charging devices (for example USB-C, lightning). In other embodiments, a mains supply is provided alternatively or additionally. This mains supply is particularly advantageous if the lunchbox is not only to be used for heating meals, but also for cooking food.

Preferably, the lunchbox has a lid that can be completely removed from a bottom part, referred to here as the base. This allows access to the food cavity. Preferably, the water also enters the heating cavity through the same opening. In other embodiments, a separate opening is provided for this purpose.

To prevent odours from escaping to the outside and to make the lunchbox transportable, there is preferably at least one seal. In addition, a device is provided which connects or closes off the food cavity to/from the heating cavity in order to enable or prevent steaming respectively. Preferably, this device also has a seal. These two seals increase safety during transport and storage of the filled and ready-to-use lunchbox.

In preferred embodiments, the lunchbox therefore comprises a first seal, wherein in the first state of the switch device the first seal seals the food cavity with respect to the heating cavity in a gas-tight manner, and in the second state of the switch device the switch device at least partially releases the first seal so that the food cavity and the heating cavity are gas-connected to each other.

In preferred embodiments, the lunchbox has a second seal which, when the lunchbox is in the closed state, seals the food cavity with respect to the outside in a gas-tight manner. The same seal is preferably designed in such a way that it seals the heating cavity and preferably also the food cavity with respect to the outside in a gas-tight and thus also liquid-tight manner in the first and second state of the switch device.

Preferably, when the lunchbox is in the closed state, both seals seal the food cavity with respect to the outside of the lunchbox. In this way, the food cavity is at least doubly protected against leakage during transport.

Depending on the embodiment, the first seal and the second seal are two separate seals. They are preferably circumferential. They are preferably made of silicone.

In a preferred embodiment, however, these two seals are formed together in one piece. Preferably, they form a self-contained part with a closed circumference and a through-opening in the middle. This sealing part can be easily manufactured from silicone, for example. The first seal preferably forms an inner part of the sealing part and the second seal forms an outer part of the sealing part.

In preferred embodiments, apart from the electronics and the operating and display elements, the lunchbox consists basically of the lid, the base and the container arranged in between.

The outer circumference is preferably defined by the lid and the base.

The lunchbox preferably has a heating element that is electrically operated. In preferred embodiments, an electronics cavity is present in the base, in which cavity electronic parts of the lunchbox, for example the heating element, are arranged. Further elements in the electronics cavity are, for example, a battery, a circuit board, cables, at least one push button, an acoustic signal output unit, at least one pressure sensor, at least one temperature sensor, at least one control unit and, at least in the case of mains operation, a transformer. A power connection and/or optical signal output units (for example LEDs) are preferably arranged in a wall of the electronics cavity. The base is preferably formed in two or more parts for this purpose.

In preferred embodiments, the lid is attached to the base by means of at least one fastening element. Preferably, several fastening elements are provided. They can be designed differently. They are preferably snap-action elements which can be clicked into the base and/or into the lid. The snap-action elements are preferably designed as tabs, which are preferably arranged on the lid. For example, they are arranged so that they can be pivoted.

The switch elements can be designed in different ways. They can be formed by the lid itself, by sliding elements for the lid or by other means.

In a preferred embodiment, at least some of these fastening elements are designed as switch elements of said switch device. The, or at least some of the, fastening elements can thus fulfil a double function: on the one hand, they enable the lunchbox to be opened and tightly closed, and, on the other hand, they enable it to be switched from a heating position to a steaming position. This is a simple construction which allows easy operation and low-cost production.

For example, one part of the fastening elements can be brought into an open position while another part remains in the closed position. The open elements allow the gas connection between the heating cavity and the food cavity; the closed elements ensure that the lunchbox is still closed gas-tight to the outside.

In preferred embodiments, when the lunchbox is in the closed state, the second seal is arranged, for example clamped, between the lid and the base and/or the container is arranged and clamped between the lid and the base.

In preferred embodiments, the lunchbox has at least one pressure sensor that is set up to detect a pressure. Preferably, the pressure sensor is designed to detect a pressure surrounding the lunchbox. The pressure sensor is arranged, for example, in a cavity which is separate from the food cavity and from the heating cavity and which is in pressure connection, for example gas connection, to the environment of the lunchbox. This cavity is preferably the electronic cavity mentioned above. For example, the pressure sensor is arranged on a common circuit board with other electronic components. Alternatively, the pressure sensor is arranged on an outside of the lunchbox.

Since a pressure sensor designed to detect the external pressure is usually not located in the food cavity or heating cavity, the pressure sensor does not necessarily have to be specially designed to be resistant to moisture, which can save costs. In addition, the pressure sensor is not contaminated by contact with the food.

In preferred embodiments, the lunchbox alternatively or additionally comprises at least one temperature sensor which is designed to detect a temperature. The temperature sensor is preferably designed to detect a temperature inside the heating cavity. Preferably, the temperature sensor is arranged in the heating cavity. In preferred embodiments, the temperature sensor is arranged in the water.

In preferred embodiments, the lunchbox has a control device that is designed to control a heating power of the heating element. For example, the control device can be designed to switch off the heating element after a defined heating period, for example to thus prevent the battery from discharging too extensively.

In preferred embodiments, the control device is designed to control the heating power of the heating element and to control it in dependence on the data detected by the pressure sensor and the temperature sensor. In particular, the heating power can be controlled as a function of the ambient pressure and the temperature in the heating cavity. In this way, for example, the heating temperature can be optimised in an energy-efficient manner. In particular, in embodiments that also allow cooking, it is also possible to prevent meals from being prepared at a temperature that is too high or too low.

This arrangement is hereby claimed as a separate invention, even without the use of the switch device. The present invention is not limited only to lunchboxes, but can also be used for other types of food preparation devices. Moreover, the device need not necessarily be suitable for storing or transporting food. For example, it is a built-in steamer in a kitchen or a steamer for home use. The corresponding method is also claimed as an invention.

This device, thanks to the control of the heating power based on the combination of external pressure measurement and heating cavity temperature measurement, has the advantage of dispensing with both error-prone valves and expensive liquid-resistant pressure sensors in the heating cavity. This increases the reliability of the device and at the same time reduces the production costs.

This device is particularly suitable, however, for lunchboxes. It creates a lunchbox that does not need a pressure relief valve. Such valves can become soiled by food and are therefore unhygienic. Due to the soiling, there is also the danger that they might not open or might not open sufficiently when needed. When they do open, however, the energy loss due to the escaping steam is relatively high, and therefore heating takes longer and more energy is consumed than necessary. These disadvantages are eliminated by using at least one pressure sensor.

In preferred embodiments, the lunchbox is designed to maintain the temperature in the heating cavity during the heating process within a range which is determined taking into account the ambient pressure.

In preferred embodiments comprising a pressure sensor designed to detect the ambient pressure, a temperature sensor designed to detect the temperature in the heating cavity, and a control device, the lunchbox is designed such that
the ambient pressure is measured via the pressure sensor at the beginning of or during a heating process;
a minimum temperature is determined from the measured ambient pressure, for example via an internal database, for example a minimum temperature at which water evaporates, and
the heating element is operated in such a way that during the heating process the temperature measured in the heating cavity by the temperature sensor is above the minimum temperature.

The lunchbox is preferably designed so that when the ambient pressure is 1.033 bar, it sets a minimum temperature of 100° C., for example because the steam temperature of water at that pressure is 100° C.

In preferred embodiments comprising a pressure sensor designed to detect the ambient pressure, a temperature sensor designed to detect the temperature in the heating cavity, and a control device, the lunchbox is designed such that
the ambient pressure is measured via the pressure sensor at the beginning of or during a heating process;
a maximum temperature within the heating cavity is determined from the measured ambient pressure, for example via an internal database; and
the heating element is operated in such a way that, during the heating process, the temperature measured in the heating cavity by the temperature sensor is below the maximum temperature, for example in such a way that the heating element is switched off if, during the heating process, a temperature which exceeds the maximum temperature is measured in the heating cavity by the temperature sensor.

For example, the lunchbox is designed so that, when the ambient pressure is 1.033 bar, it sets a maximum temperature of 106° C., for example because the steam temperature of water at a pressure that is 0.3 bar higher is 106° C. and therefore, when the temperature is below 106° C., the pressure difference between the heating cavity and the environment is a maximum of 0.3 bar.

In preferred embodiments, the lunchbox has a redundant sensor system for heating power control in order to further increase safety. Preferably, the lunchbox has two sets of sensors, for example each comprising an external pressure sensor and a heating cavity temperature sensor. The control device is preferably designed to interrupt the heating process if at least one part of the sensor system detects values outside the values classified as safe. The redundant sensor system thereby reduces the susceptibility to errors.

The lunchbox according to the invention has a signal output unit. The signal output unit is designed to output an acoustic and/or optical signal. An optical signal output unit can be designed as a light unit, for example comprising one or more LEDs, and can be designed to light up in one, two or more colours.

In preferred embodiments, the signal output unit indicates, for example,
whether the heating element is activated,
a progress (especially a completion) of a heating or steaming process,
a state of charge of the battery,
a temperature in the heating cavity and/or food cavity,
error messages, and/or
a filling level in the heating cavity.

In preferred embodiments, the lunchbox has a user interface through which the user can start a heating process. The user interface has, for example, a switch. The user interface is preferably designed so that the user can cancel a heating process.

In preferred embodiments with a control unit, a temperature sensor designed to detect the temperature in the heating cavity, and a signal output unit, the control unit is designed to output a signal if a temperature increase cannot be detected sufficiently quickly after the heating element has heated up. Such a case can occur, for example, if there is no or too little water in the heating cavity, and the user can be made aware of this by the signal.

Since not only the water but also the air in the lunchbox heats up, this can lead to an undesirably high pressure inside. In a preferred embodiment, the lunchbox therefore has a wall that moves outwards when the water heats up, which enables an increase in volume in an interior of the lunchbox when the lunchbox is sealed with respect to the outside. For example, the lid of the lunchbox is flexible so that it allows a change in volume when the interior is heated. For example, the lid can bulge inwards automatically when closed or by manual pressure and can move outwards while the lunchbox is heating up. In alternative embodiments, the entire lid can be moved upwards manually or automatically by means of the positive pressure in order to increase the volume during heating.

The outer seal is preferably designed to open or leak at a predefined internal pressure. If the outer seal is a sealing ring, it preferably leaks from a certain internal pressure. This prevents excessive positive pressure inside the lunchbox. In preferred embodiments, the lunchbox is tight up to a pressure difference of 0.3 bar and it leaks or opens from a pressure difference between internal pressure and external pressure of at least 0.31 bar and at the latest at 0.49 bar.

By means of the control unit, it is preferably possible to check whether all or part of the air has escaped from the lunchbox. When the food and the heating chamber cool down again, a negative pressure can occur, which makes it difficult to open the lunchbox. In some embodiments, this can also be avoided by means of the control. If it is determined that the lunchbox is leaking in the event of positive pressure or negative pressure, in some embodiments automatic pressure compensation takes place. In all of these variants, a first temperature sensor is provided that determines the temperature in the heating cavity outside the water, and a second temperature sensor is provided that determines the water temperature in the water of the heating cavity. Other temperature sensors may also be provided. A pressure sensor is not absolutely necessary for this control.

In this embodiment, the device according to the invention preferably has a food cavity for receiving food, a heating cavity having a water cavity for holding water, and a heating element for heating water in the water cavity. It further comprises a first temperature sensor designed to detect a temperature inside the heating cavity but outside the water cavity, and a second temperature sensor designed to detect a temperature inside the water cavity. A control device is designed to control a heating power of the heating element depending on the data detected by the first and second temperature sensors. In this way, it can be prevented that a positive pressure persists for a longer period of time and that all water escapes from the lunchbox. In addition, it is possible to prevent the interior from cooling down too much and making it impossible to open the lunchbox due to the resulting negative pressure.

The boiling temperature of the water is measured using the first temperature sensor located in the water. This allows conclusions to be drawn about the prevailing absolute internal pressure. Depending on the position and progress of the heating process, the second temperature sensor can be used to measure the temperature in the water vapour, in the steam-air mixture or in the air in the heating cavity.

A lunchbox with two temperature sensors arranged in this way can also be used without the features of the switch device. This is additionally claimed here as a separate invention.

The invention further relates to a food unit comprising a previously described container of the presented portable lunchbox and food contained therein. The food unit further comprises a food unit lid for enclosing the food, preferably in a gas- and/or liquid-tight manner, between the container and the food unit lid. The food unit is placed in the lunchbox—possibly after removal of packaging such as the food unit lid—with the food unit container replacing the lunchbox container. The food in the food unit may then be heated and/or steamed as previously described. In particular, for food suitable for steaming, the food unit container may have openings through which water vapour may be drawn. A base of the container can be designed as a grate, for example.

Depending on the embodiment, the container is provided with a single cavity or it is divided. For example, a different food may be arranged in each part of the unit. Individual parts can be closed or provided with openings.

For example, a food unit may have two parts, the first part containing a food to be heated without steam contact and the second part containing a food to be heated by means of water vapour, i.e. to be steamed. The two parts can be packaged in such a way that they can be opened independently of each other. For preparation, for example only the part with the food to be steamed is opened, and the lunchbox is operated in the second state of the switch device. In this way, the food is steamed in the opened part, while the other part remains thermally insulated and is thus only heated.

Further embodiments are described in the dependent claims. The features of the claims dependent on claim 1 can furthermore be combined with the features of claim 15 without using the switch device.

BRIEF DESCRIPTION OF THE DRAWINGS

Preferred embodiments of the invention are described below with reference to the drawings, which are provided for explanatory purposes only and are not to be construed as limiting. In the drawings.

DESCRIPTION OF PREFERRED EMBODIMENTS

Figure 1:
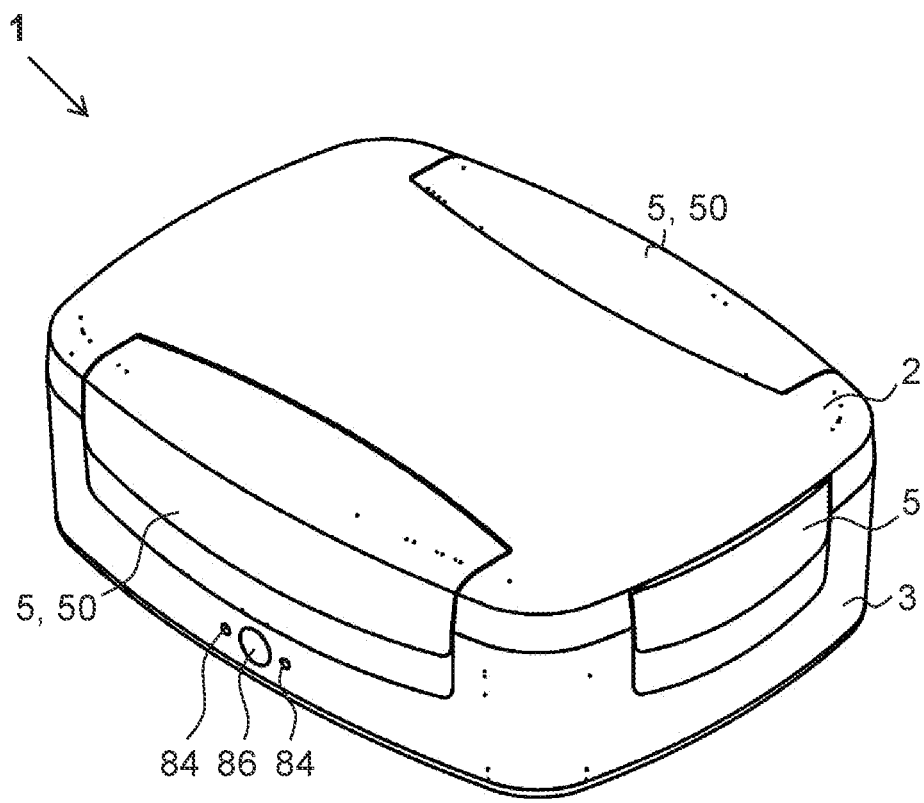
FIG. 1 shows a perspective view of a lunchbox according to the invention in a first embodiment.

FIG. 1 shows a perspective view of a lunchbox according to the invention. The lunchbox 1 shown has a lid 2 which is attached to a base 3 with fastening elements 5 in the form of hinged tabs. The lid 2 is preferably completely removable from the base 3 so that an opening of the base 3 is completely exposed. The tabs 5, 50 are preferably attached pivotably to the lid 2.

Two of the tabs are also designed as switch device 50, which can be used to switch between a heating mode and a steaming mode. Preferably, a tab 5 is arranged on each side of the lid 2, with the mutually opposed larger tabs 50 on the longitudinal sides of the lid preferably being designed as switch device. The tabs 50, which are designed as switch device, are preferably embodied as approximately right-angled angle elements. They preferably extend partially over the upper side of the lid 2, and they are preferably flush with the surface of the lid 2 in the closed state of the lunchbox 1.

The lunchbox 1 is preferably approximately cuboid-shaped. However, it can also have other shapes. Preferably, the base 1 is flat on its underside for resting on a table or it has corresponding feet. Preferably, the lunchbox 1 has no protruding elements when closed.

On a front side of the lunchbox 1, a user interface 86 in the form of a push button, with which for example a heating process can be initiated, and two signal output units 84 in the form of LED lights, which can serve for example as status indicators or warning signals, are arranged in the base 3.

Figure 2:
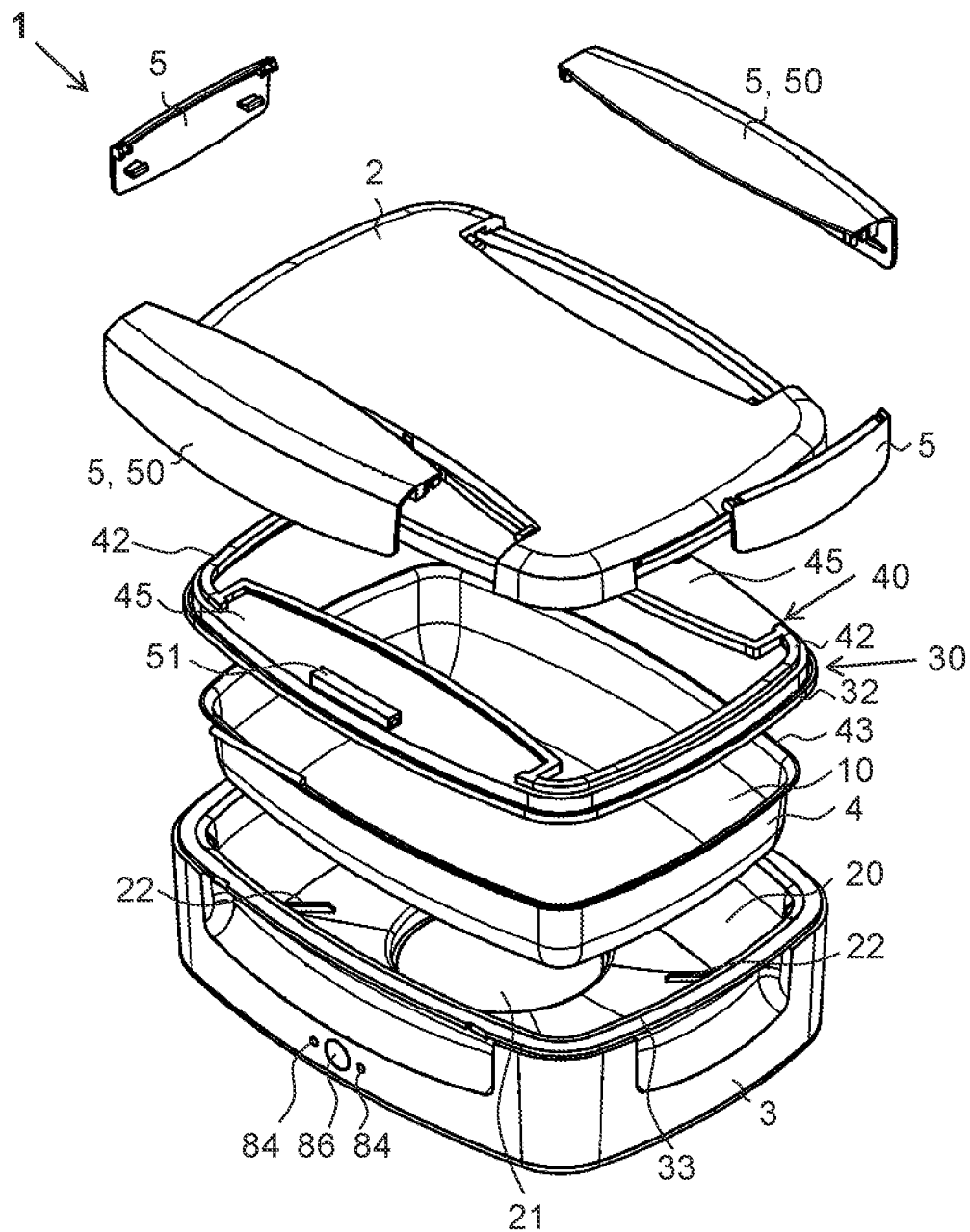
FIG. 2 shows an exploded view of the lunchbox according to FIG. 1.

FIG. 2 shows an exploded view of the lunchbox 1. A container 4 for holding food is arranged between the lid 2 and the base 3. The lid 2, the base 3, the container 4 and the tabs 5, 50 are preferably made of plastic. Parts of them can also be made of metal or another material.

The container 4 defines a food cavity 10 for receiving the meals to be heated or, if necessary, food to be cooked. The base 3 defines a heating cavity 20 to receive water for heating or steaming the food. Between the lid 2, on the one hand, and the base 3 and the container 4, on the other hand, there is arranged a seal comprising a first seal 40 and a second seal 30. The first and second seals 40, 30 may consist of two separate elements or they may be formed together in one piece. In this example, they are formed together in one piece.

Figure 3:
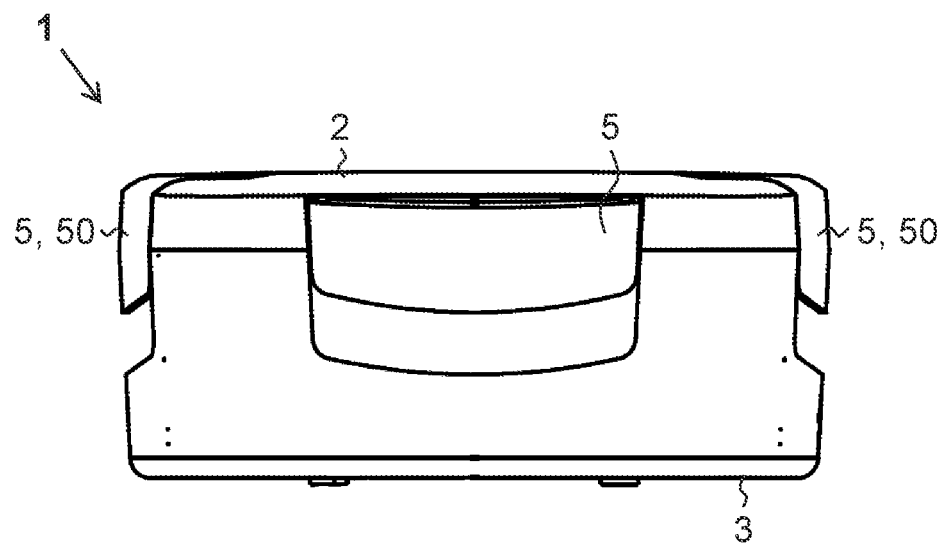
FIG. 3 shows a side view of the lunchbox according to FIG. 1.

FIG. 3 shows a side view of the lunchbox 1 in the closed state. This state is used for transporting the lunchbox, for storing the food and also for heating the meals without steam. This state is referred to as the heating mode in the following.

Figure 4:
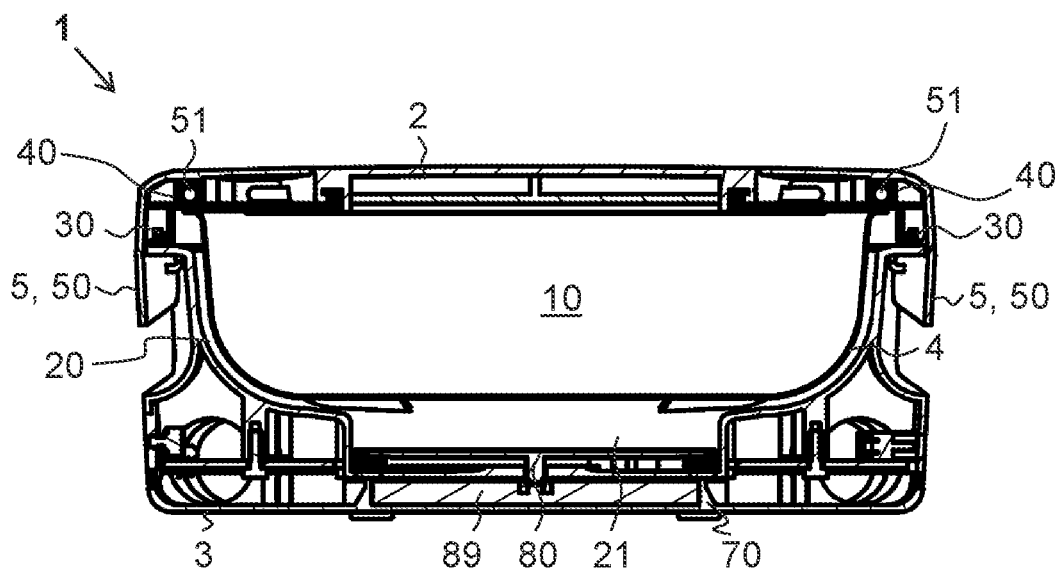
FIG. 4 shows a cross-section through the lunchbox according to FIG. 1.

FIG. 4 shows a cross-section of the lunchbox 1 in the heating mode. The two tabs formed as a switch device 50 are in a first, depressed state, so that they press the first seal 40 against a circumferential upper edge 43 of the container 4. This edge can be seen in FIG. 2. As a result, the upper edge 43 is circumferentially sealed and a gas connection between the heating cavity 20 and the food cavity 10 is closed. No water vapour can enter the food cavity 10. Instead, the water vapour heats the outside of the container 4 and thus also the food (not shown) arranged in the container 4. In this first state of the switch device 50, food arranged in the food cavity 10 can thus be heated. The water vapour is generated in the heating cavity 20, more precisely in a water cavity 21 shown in FIG. 13, which is part of the heating cavity 20.

The second seal 30 is pressed by the lower edge of the lid 2 against an upper edge 33 of the base 3 and seals the heating cavity 20 and thus also the food cavity 10 in a gas-tight manner with respect to the outside so that no contents, such as water vapour or water or food, can leave the system. The upper edge 33 of the base 3 is clearly visible in FIG. 2. This means that the lunchbox is tightly sealed for transport. Furthermore, no odours can escape to the outside during storage and also during preparation of the meals. The two seals 30, 40 also seal the lunchbox twice, so that optimum leakage protection is also guaranteed.

The heating element 80 and other electronic components are arranged in an electronics cavity 70 of the base 3, for example a circuit board 89 to which the user interface 86 and the signal output unit 84 are connected. The base 3 preferably has a lower lid which allows access to the electronics cavity 70 at least during assembly.

Figure 5:
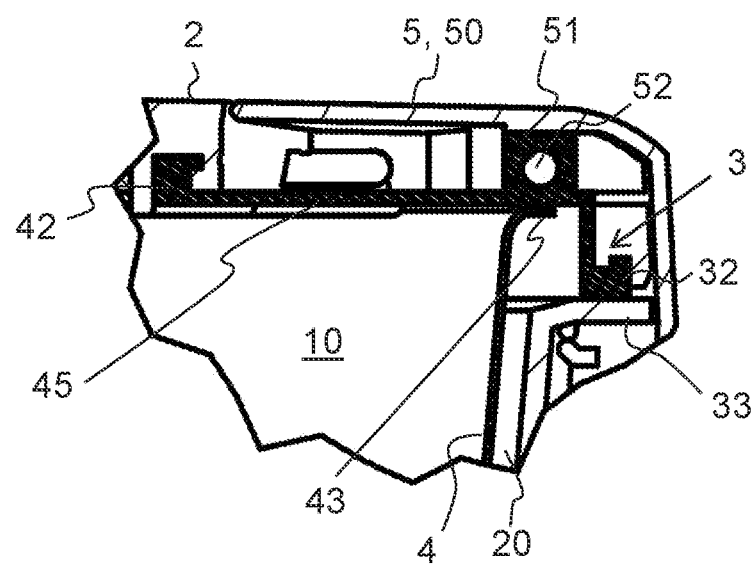
FIG. 5 shows an enlarged detail of the lunchbox according to FIG. 4.

FIG. 5 shows an enlarged detail of a cross-section of the lunchbox 1 in heating mode. It can be clearly seen that the tab formed as a switch device 50 is pressed down and thus presses the first seal 40 against the upper edge 43 of the container 4, whereby a gas connection between the heating cavity 20 and the food cavity 10 is closed.

Figure 6:
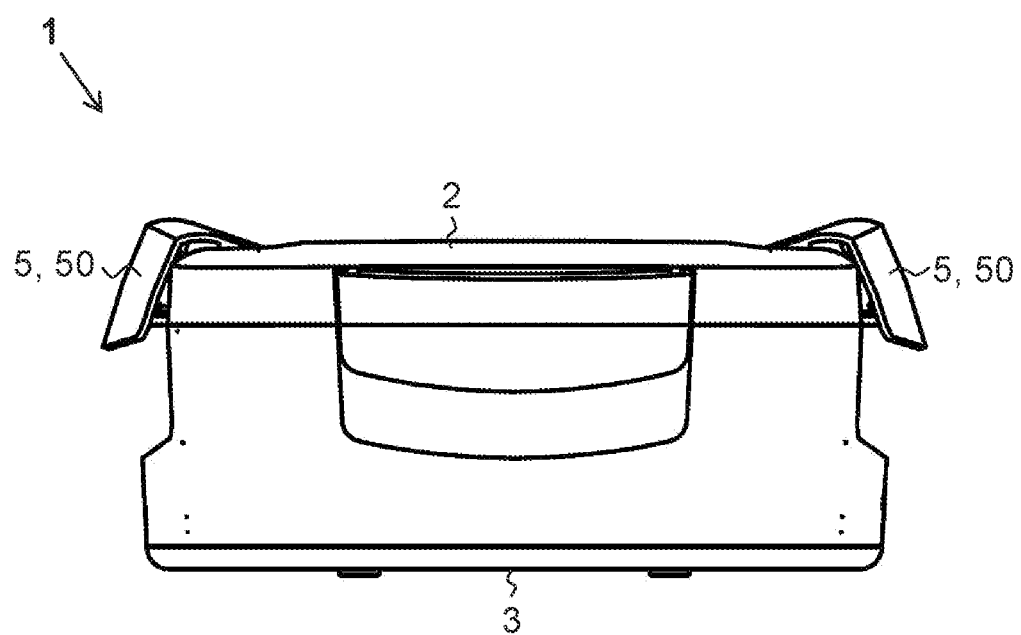
FIG. 6 shows a side view of the lunchbox according to FIG. 1 in a steaming mode.

FIG. 6 shows a side view of the lunchbox 1 in steaming mode. The two fastening elements 5 designed as a switch device 50 are in a second, raised state in which they also no longer fasten the lid 2 to the base 3. However, the two other tabs 5 still close the lunchbox.

Figure 7:
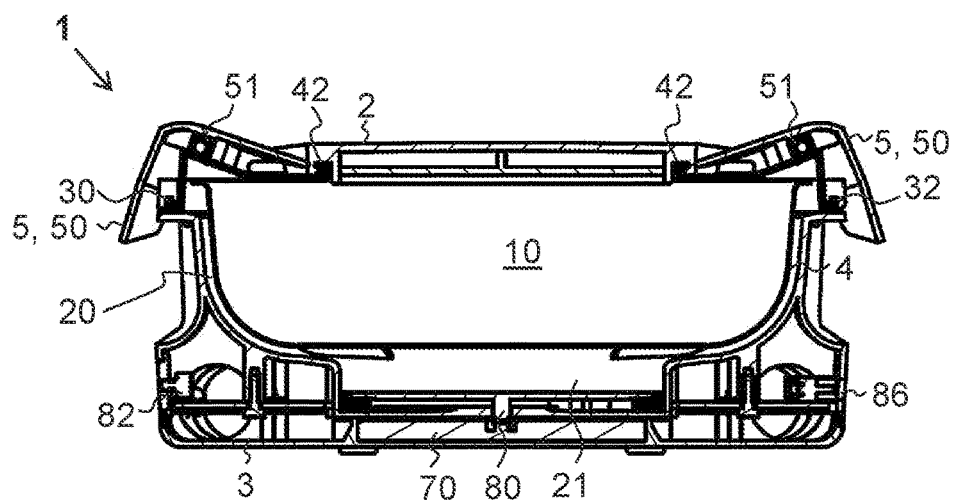
FIG. 7 shows a cross-section through the lunchbox according to FIG. 6.

FIG. 7 shows a cross-section of the lunchbox 1 in steaming mode. The two fastening elements 5, designed as a switch device 50, are in a second, raised state so that they lift the first seal 40, for example as shown via a mechanical connection 51, whereby a gas connection between the heating cavity 20 and the food cavity 10 is opened. Through this, water vapour, which has been generated in the heating cavity 20 by evaporation of water, can enter the food cavity 10 and steam food arranged there.

Also in this second state of the switch device 50, the second seal 30 is pressed by the lower edge of the lid 2 against the upper edge 33 of the base 3 and seals the entirety of the heating cavity 20 and food cavity 10 in a gas-tight manner with respect to the outside so that no water vapour can leave the system.

Figure 7A:
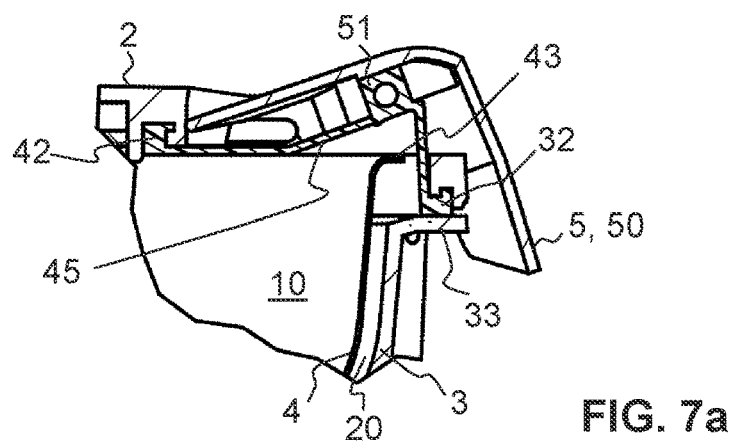
FIG. 7a shows an enlarged view of a detail of the lunchbox according to FIG. 7.

FIG. 7a shows the state with the tab raised and the gas connection open. The sealing wing 45 is raised together with the flap or tab 50. The upper edge 43 of the container 4 is exposed in the area of the sealing wing 45 and the gas connection between the heating cavity 20 and the food cavity 10 is open. However, the second sealing ring 32 of the second seal 30 still rests on the upper edge 33 of the base 3 and seals with respect to the outside over the entire circumference of the base 3.

Figure 8:
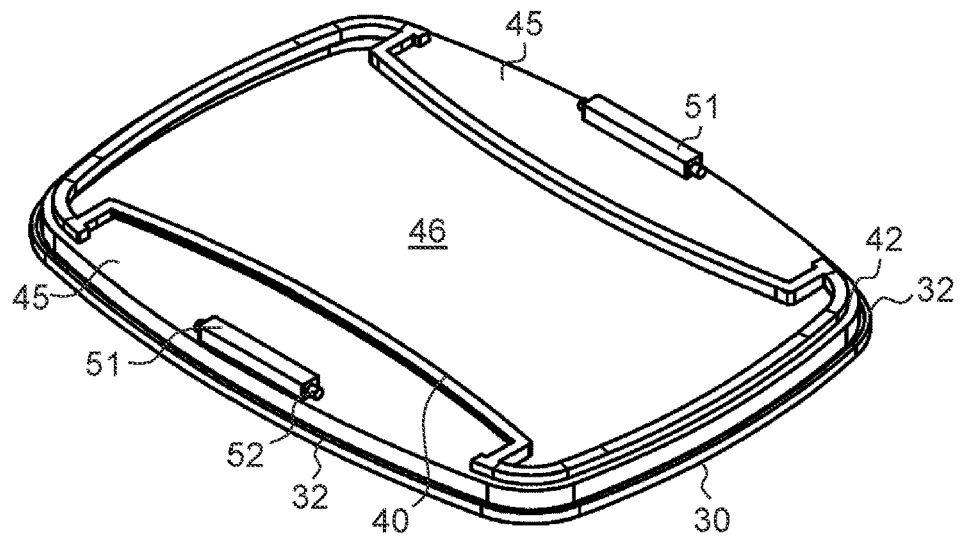
FIG. 8 shows a perspective view of a seal of the lunchbox according to FIG. 1.

FIG. 8 shows the one-piece seal comprising the first seal 40 and the second seal 30. The one-piece seal is preferably made of silicone. The second seal 30 has a second sealing ring 32, which in the orientation shown projects downwards, but in the state of use is directed upwards, but has a sealing surface directed downwards. The first seal 40 has a first sealing ring 42, which projects upwards however, as well as two sealing wings 45, on each of which a mechanical connecting element is fastened, via which the switch device can lift at least a part of the first seal 40, in particular the sealing wings 45. In this example, the mechanical connecting element is a rigid cuboidal sleeve 51 made of plastic with a rigid pin 52 projecting on both sides. The central area 46 is empty, i.e. the seal is formed only by a circumferential, self-contained annular structure.

Figure 9:
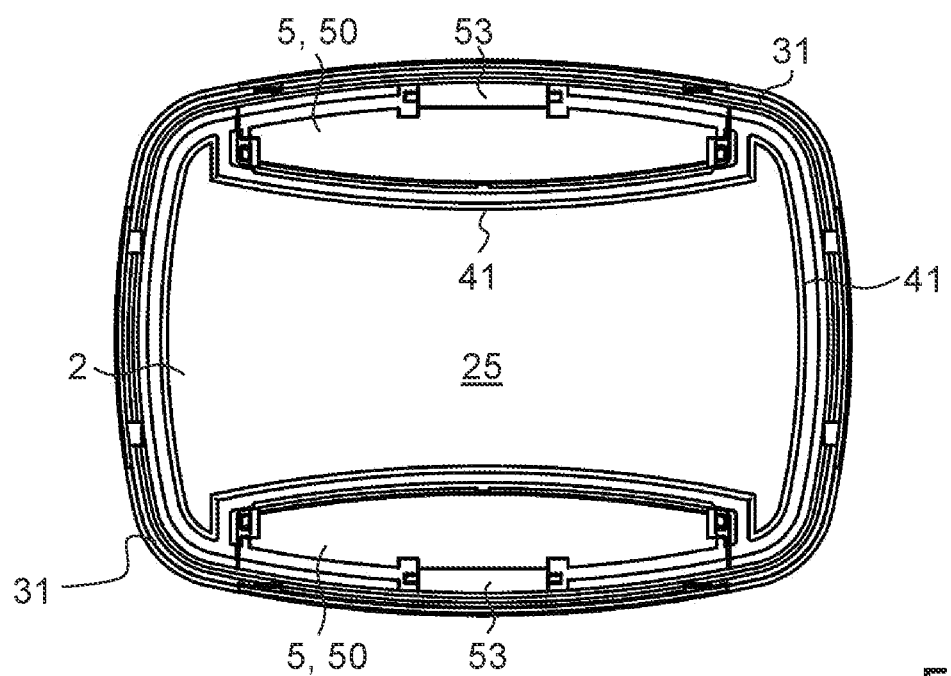
FIG. 9 shows a view of a lid according to FIG. 1 from below without seal.
Figure 10:
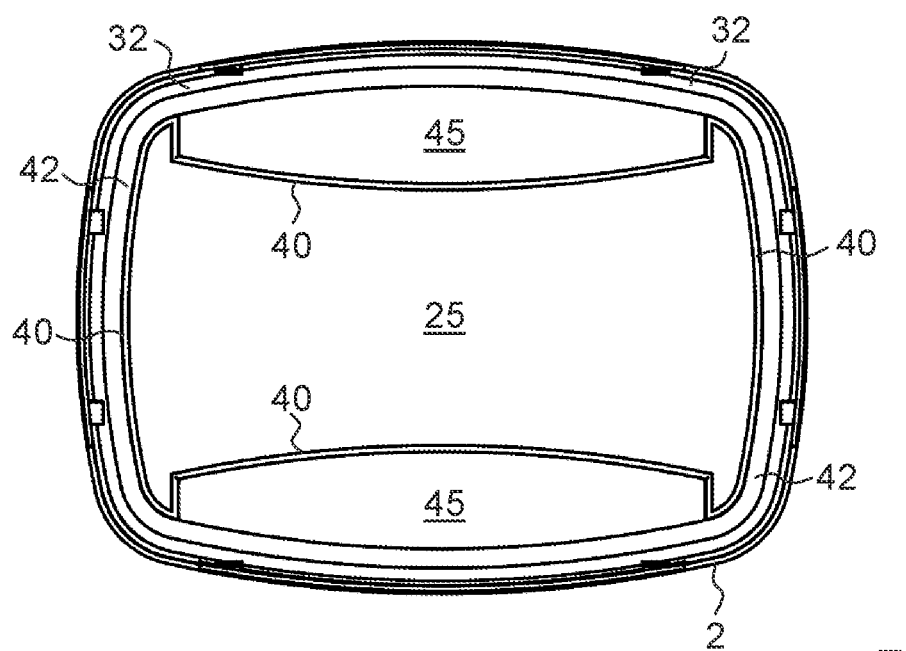
FIG. 10 shows a view of the lid of the lunchbox according to FIG. 9 with the seal according to FIG. 8 from below.

FIG. 9 shows the lid 2 from below. Its underside is denoted by the reference sign 25. First structures 41 and second structures 31 are arranged on the underside of the lid 2. The first structures 41 are designed to interact with the first sealing ring 42 of the first seal 40, for example to guide it, to favour its correct seating and/or to improve its sealing properties. For example, the first structures 41 may comprise a first ledge projecting from the lid 2, against which ledge the first sealing ring 42 of the first seal 40 abuts. Preferably, the structures have two second ledges protruding from the lid 2, between which ledges the first sealing ring 42 of the first seal 40 engages. The two second ledges are preferably substantially parallel to each other and they are preferably formed close to each other so that the first sealing ring 42 of the first seal 40 is clamped between them. In FIG. 10, the one-piece seal 30, 40 is inserted.

The second structures 31 are designed to interact with the second sealing ring 32 of the second seal 30, for example to guide it, to promote its correct seating and/or to improve its sealing properties. The structures have, for example, a shoulder running circumferentially around the lid 2, against which shoulder the second sealing ring 32 of the second seal 30 can bear and which presses the second sealing ring 32 against the base 3 when the lunchbox is closed. In another embodiment, the second structures 31 have the ledge running circumferentially around the lid 2, against which ledge the second sealing ring 32 of the second seal 30 bears and is pressed in. In this example, the two structures 41 and 31 are two circumferential grooves.

Structures 53 are arranged on the two fastening elements 5 of the switch device 50, in which the connecting elements 51, 52 of the first seal engage. Receptacles 53 are provided for this purpose. When the fastening elements 5 are lifted, the connecting elements 51 and thus the adjacent part of the seal 40 are also lifted. This opens the gas connection between the heating cavity and the food cavity. When the fastening elements 5 are pressed down, the connecting elements 51 are also pressed down, closing the gas connection between the heating cavity and the food cavity.

Figure 11:
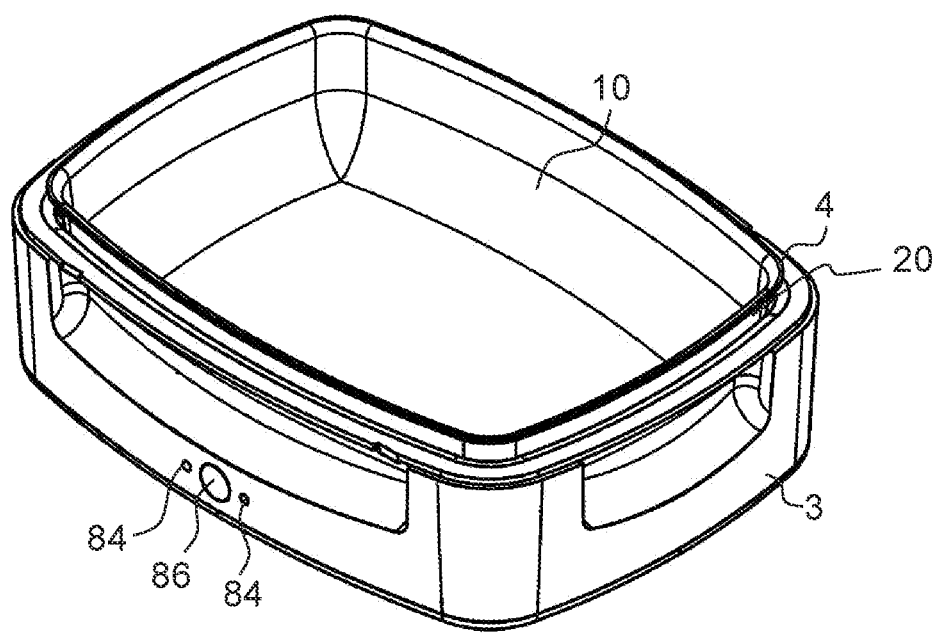
FIG. 11 shows a perspective view of a base of the lunchbox according to FIG. 1 with an inserted container.
Figure 12:
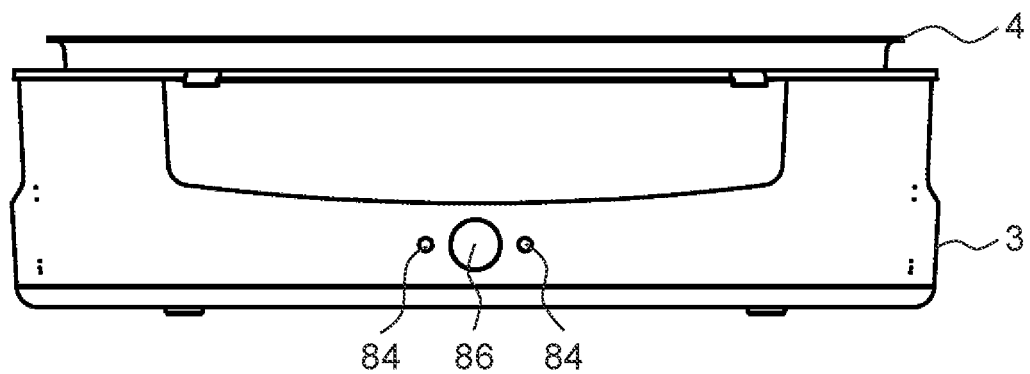
FIG. 12 shows a side view of the base with inserted container according to FIG. 11.

FIGS. 11 and 12 show the base 3 with the container 4 inserted in it. The container 4 is designed as a recessed tray. It has a laterally protruding flat edge which projects above the upper edge of the base 3 and preferably does not rest on it. A gap between the base 3 and the container 4 allows water vapour, which is produced in the water cavity 21 below the container 4, to rise through the heating cavity 20 between the base 3 and the container 4. Since the container 4 protrudes beyond the base 3, it can also be removed more easily from it.

Figure 16:
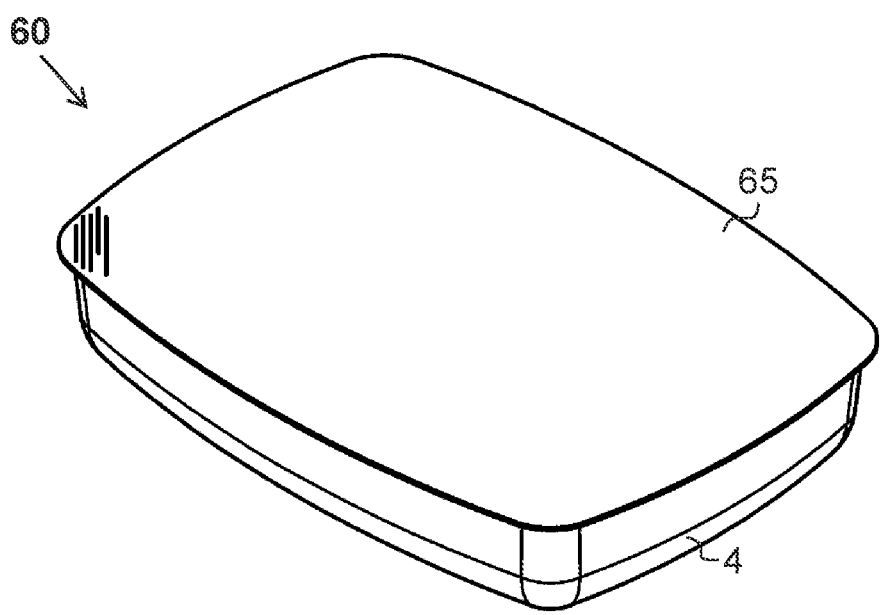
FIG. 16 shows a perspective view of a food unit for use in the lunchbox according to FIG. 1.

FIG. 16 shows a preferred food unit 60 before use. It comprises the container 4 and a lid 65. The lid 65 is preferably made of a gas-tight foil which is detachably glued to the upper edge of the container 4. The container 4 can thus be used to assemble meals that have already been prepared for heating or prepared for steaming. The unit can thus be offered to consumers in appropriate sales outlets. Depending on the type of meals being offered, the lid 65 may be removed in whole or in part before the container 4 is inserted into the lunchbox, thus allowing water vapour to reach the food. However, the lid can also be left on the container 4 for other types of preparation.

Figure 13:
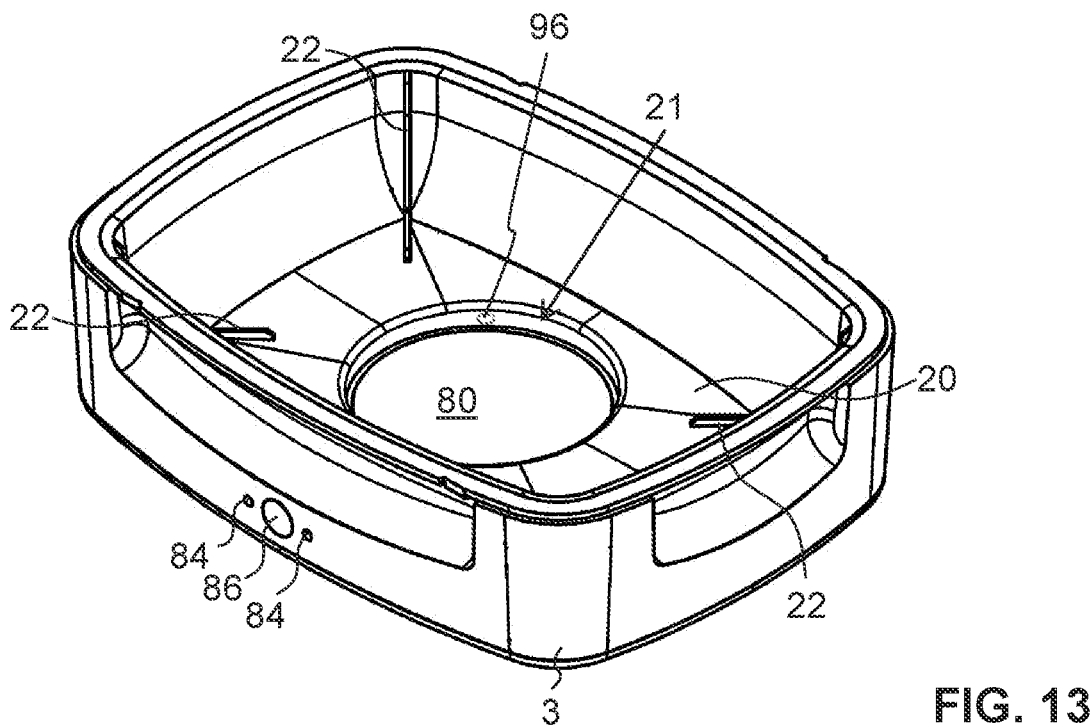
FIG. 13 shows a perspective view of the base according to FIG. 11 without container.

FIG. 13 shows a perspective view of the base 3. The base 3 is designed to form a lower part of the heating cavity 20. In the centre of the base of the heating cavity 20 there is a recess in the form of the water cavity 21, which is designed to receive water to be evaporated. The edge of the water cavity 21 preferably has a circumferential ledge or other feature which serves as an indicator for a maximum or a preferred filling level. The interior of the heating cavity 20 has ribs 22 which are configured to hold a container inserted into the base 3 at a distance so that water vapour can rise between the base 3 and the container. As shown, the base 3 of the heating cavity 20 can be formed with a slope, preferably such that water and condensed water present on the base 3 of the heating cavity 20 can flow back into the water cavity 21. The heating element 80 is preferably arranged at or below the water cavity 21.

Figure 14:
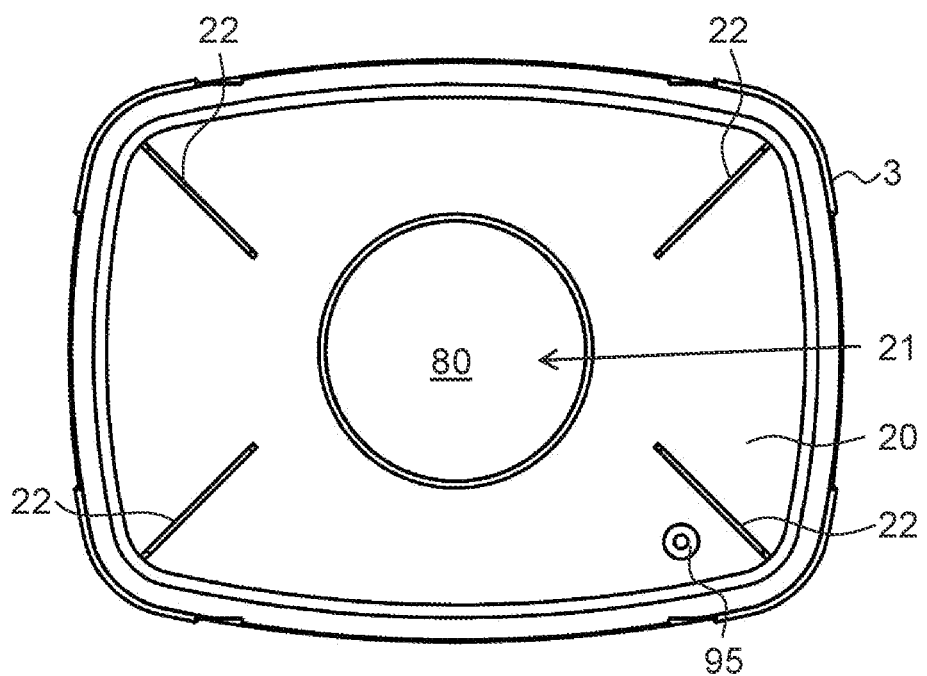
FIG. 14 shows a view from above of the base according to FIG. 13.

FIG. 14 shows the base 3 from above. A recess is preferably formed in the base 3, in which recess at least one first temperature sensor 95 and/or a cable connection between a first temperature sensor 95 and the circuit board 89 arranged inside the base 3 is arranged. This first temperature sensor 95 can also be arranged inside the water cavity 21. Preferably, however, it is located in the area of the heating cavity where it comes into contact with air and/or water vapour and/or with an air/water vapour mixture.

In some embodiments, a second temperature sensor 96 is present, which is preferably arranged in the water cavity 21 and is thus located in the water. If both temperature sensors 95, 96 are present, no pressure sensor is present, depending on the embodiment. The second temperature sensor can be seen in FIG. 13.

Figure 15:
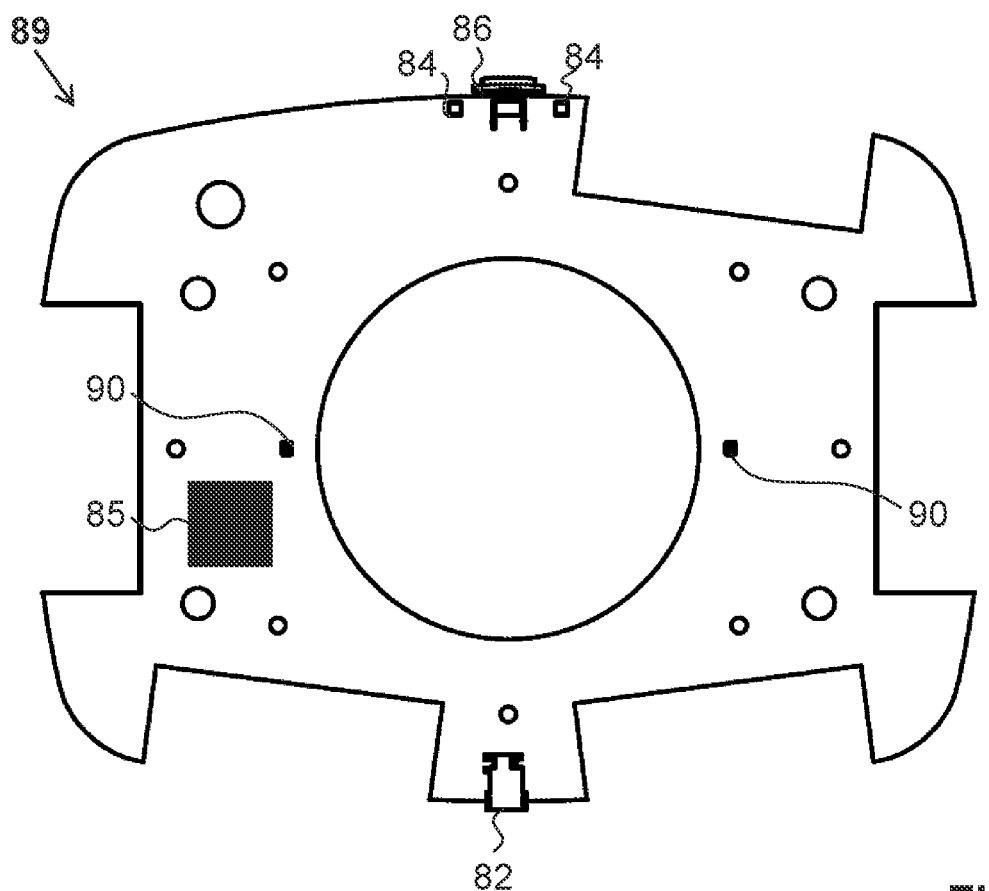
FIG. 15 shows a view of a circuit board of the lunchbox according to FIG. 1.

FIG. 15 shows the circuit board 89 of the lunchbox as it is preferably arranged in the electronics cavity. The user interface 86, for example in the form of the push button already mentioned, a control device 85, the signal output unit 84 in the form of at least one LED light, a power connection 82 and at least one pressure sensor 90 are arranged on the circuit board 89. In the centre, the circuit board 89 has a recess in which the water cavity 21 of the base 3 can engage. The circuit board 89 preferably has a connection for controlling and/or supplying power to the heating element 80 and/or a connection to a battery and/or a mains supply.

The circuit board 89 is preferably arranged in such a way that it is in contact with the environment of the lunchbox in terms of pressure, so that the pressure sensor 90 can detect the ambient pressure. For this purpose, it is sufficient, for example, that the lower area of the lunchbox is not airtight. This allows the control unit 85, which may comprise a database, for example in an EEPROM (not shown), to determine a minimum required temperature and/or maximum allowable temperature in the heating cavity, which can be monitored by the first temperature sensor 95 arranged in the heating cavity, and to control the heating power of the heating element 80 accordingly.

Figure 17:
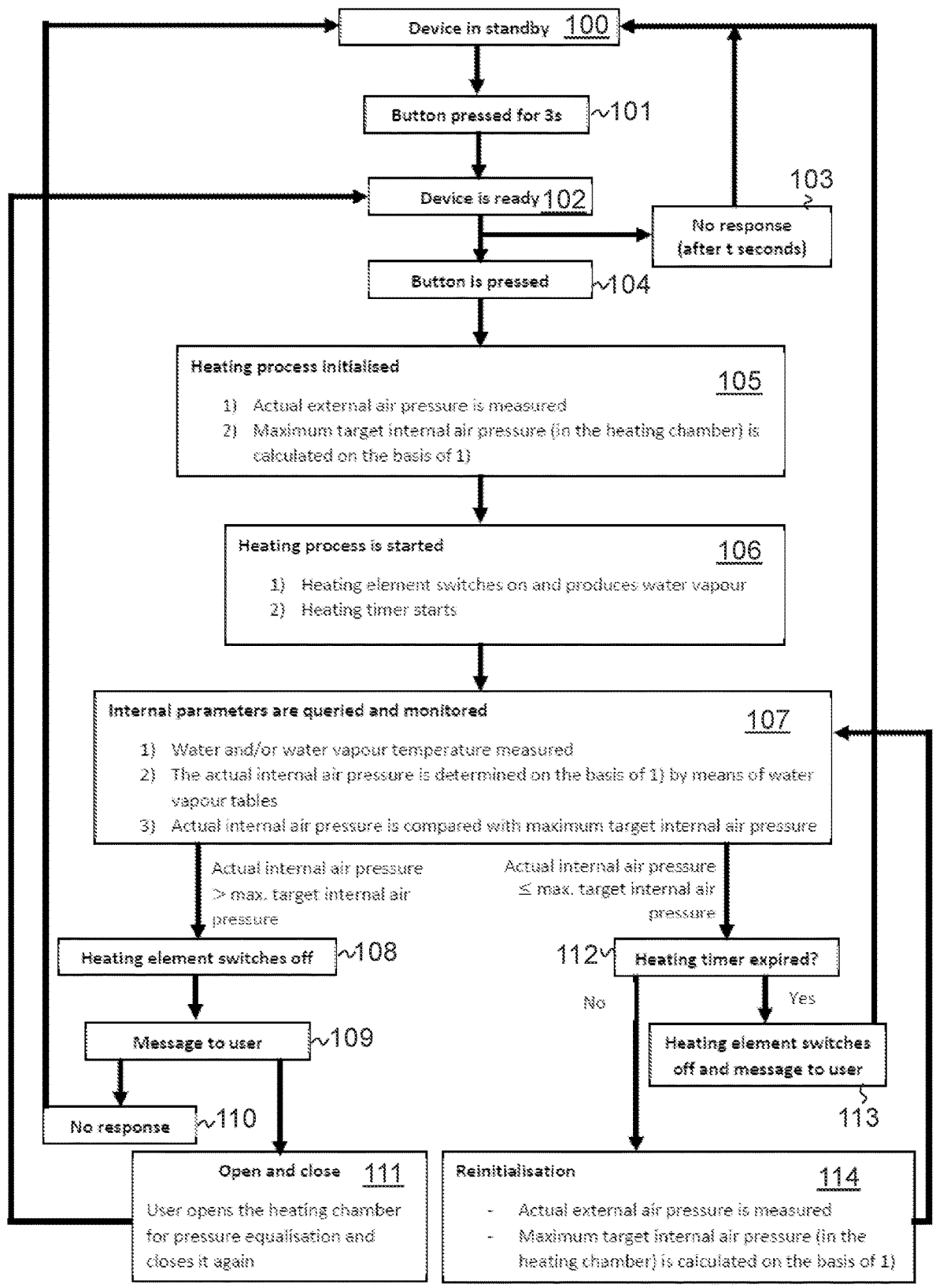
FIG. 17 shows a flowchart of an operation of the lunchbox according to FIG. 1.

FIG. 17 shows a possible flowchart for the operation of the lunchbox. In step 100, the device, i.e. the lunchbox, is in a standby mode in which the energy consumption can be minimised. In step 101 the device is activated, for example by pressing the user interface 86, so that the device is ready in step 102. This can be signalled to the user for example by the signal output unit 84, for example in the form of a green light indicator.

If no further commands are entered via the user interface for a predefined time t, the device automatically switches back to standby mode in step 103 in order to be able to save power again. If, however, as shown in step 104, the user initiates a heating process, the heating process is initialised in step 105, and an actual external air pressure, i.e. an ambient pressure, is measured and a maximum target internal pressure is calculated from the measurement result. In the next step 106, the heating process is then started, wherein the heating element is switched on so that—if there is water in the heating cavity—water vapour is generated, either for heating or for steaming food in the food cavity. In addition, a heating timer is started. The activation of the heating element can be indicated to the user, for example, by a red light signal of the signal output unit 84.

During the heating process, the internal parameters, i.e. the temperature of the water or water vapour inside the lunchbox, are queried and monitored, for example permanently, periodically or at fixed intervals (step 107). Based on the measured temperature, the actual air pressure can be concluded, for example via a water vapour table, and this can be compared with the target internal air pressure defined in step 105.

If the actual internal air pressure is greater than the maximum target internal pressure, the heating element is switched off in step 108 and a message is issued to the user in step 109, for example via a red flashing warning signal. If the user does not react within a certain period of time, the device can be put back into standby mode in step 110. However, if the user opens and closes the heating chamber in a step 111 and thus equalises the pressure, the device can be put back into an operational mode from which the user can restart the device.

As long as the actual internal air pressure is less than or equal to the maximum target internal pressure and the heating timer has not yet expired, the device is reinitialised, for example periodically or at set intervals, and in step 114 the actual external air pressure is measured again and the maximum target internal air pressure in the heating chamber, i.e. in the heating cavity, is calculated. If the heating timer expires, the heating element is switched off in step 113 and a corresponding message is issued to the user, for example via a green flashing signal. The device may be configured to then automatically switch back to standby mode.

In the embodiment which has the first temperature sensor 95 outside the water and the temperature sensor 96 in the water, the control unit can be used to check and, depending on the variant, to control the tightness. This embodiment is preferably combined with the variant in which the outer seal becomes leaky or opens from a certain pressure difference between internal and external pressure.

In a first variant, heating is carried out at maximum power. The absolute internal pressure no longer increases from a defined relative pressure because the outer seal leaks and the heating cavity is therefore no longer tight. The levelled absolute internal pressure is determined by means of the temperature measured by the second temperature sensor 96, i.e. by means of the measured water temperature. The first temperature sensor 95 measures the temperature outside the water, i.e. the temperature of the air/steam mixture. Heating continues at maximum power until the temperature measured by the first temperature sensor 95, i.e. the internal temperature, corresponds approximately to the water temperature. From this point on, it can be assumed that the air has partially or completely escaped from the lunchbox. The heating power is now reduced so that the outer seal can close again and the heating cavity is sealed again.

In another variant, the heating power is already reduced shortly after reaching the absolute internal pressure, which would subsequently lead to leakage of the heating cavity.

The switch device which opens or closes a gas connection between the heating cavity and the food cavity can be designed in different ways. Accordingly, the seals, the shape of the lid and, if necessary, also the shape of the upper part of the base are also designed differently. Some examples of how the switch device can be designed are given below. The parts of the lunchbox according to the invention that are not described or shown preferably correspond to the components according to the first embodiment shown and described in detail further above.

These embodiments described below have the advantage of minimising the production costs of the lunchbox. The embodiments described below have a lid 2 that closes a base 3. The lid 2 can be completely removed from the base 3 or hinged to it. In each case, the lid 2 is preferably fixable in its closed position so that the lunchbox can be transported. These closures are not presented below. Flaps and tabs can be used, for example, as in the first example, without these having a switching function for switching between steaming and heating.

Figure 18:
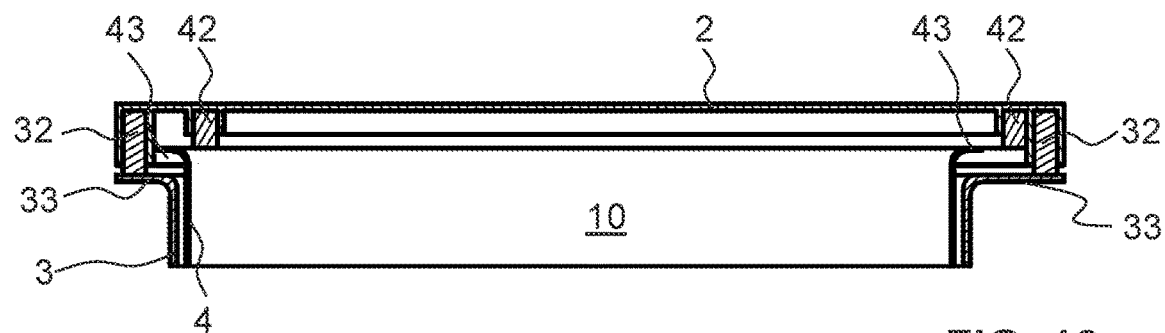
FIG. 18 shows a cross-section through a part of a lunchbox according to the invention in a second embodiment with the gas connection open.
Figure 19:
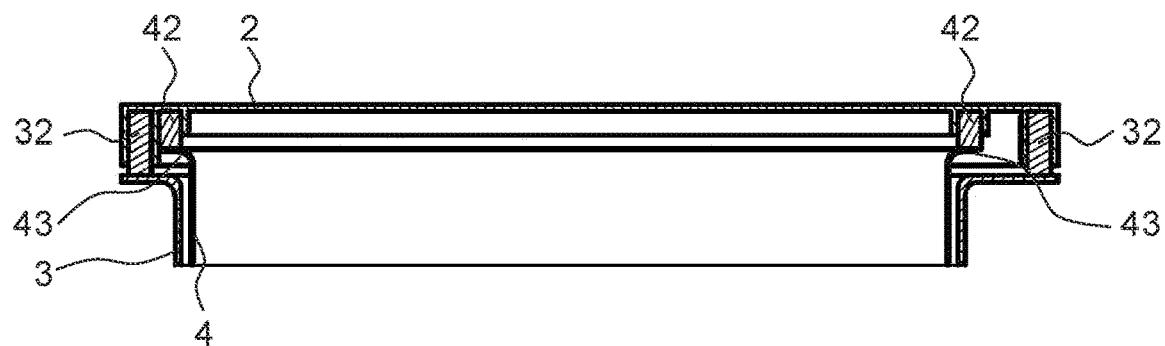
FIG. 19 shows a cross-section through the part of the lunchbox according to FIG. 18 with the gas connection closed.
Figure 20:
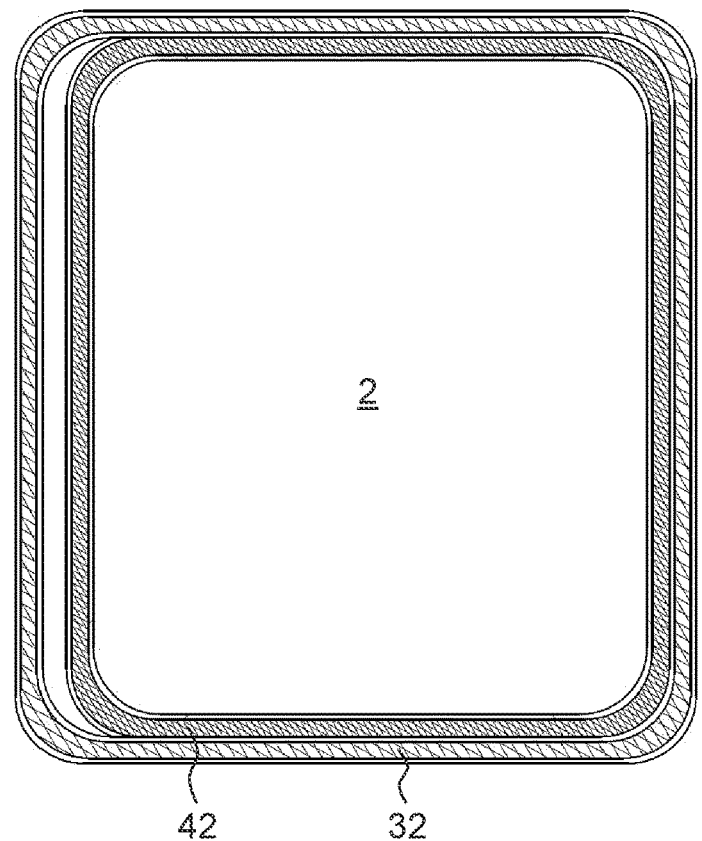
FIG. 20 shows a view from below of the lid of the lunchbox according to FIG. 18.

FIGS. 18 to 20 show a second embodiment of the lunchbox according to the invention. The lid 2 no longer has tabs or flaps as a switch device, but the lid 2 itself forms the switch device. It is asymmetrical for this purpose. As can be seen in FIG. 20, it has two circumferential sealing rings 32, 42, with the inner sealing ring 42 having a greater distance to the outer sealing ring 32 on one longitudinal side of the lid 2 than on the opposite longitudinal side. Along the two other longitudinal sides, the two sealing rings 32, 42 preferably run at the same distance from each other. Preferably, the different distance is present along the longer longitudinal sides. The lid 2 preferably has a rectangular basic shape. However, other shapes are also possible as long as the lid 2 can be placed on the base 3 in two different, well-defined positions.

The base 3 has a circumferential upper edge 33, which is also not symmetrical. As can be seen in FIGS. 18 and 19, the edge 33 is longer on one longitudinal side than on the other side.

The lid 2 can be placed in a first switching position on the upper edge 33 of the base 3. The outer sealing ring 32 seals here against a protruding flange of the base 3. The inner sealing ring 42 has no sealing function. The upper edge 43 of the container 4 is not sealed. The gas connection between the food cavity 10 and the heating cavity is open. It runs between the side walls of the base 3 and the container 4. The lunchbox is ready for steaming.

In FIG. 19 the lid 2 is turned by 180°, i.e. is in a second switching position. The outer sealing ring 32 is still in circumferential sealing contact with the upper edge 33 of the base 3.

However, the inner sealing ring 43 is now also in circumferential sealing contact with the upper edge 43 of the container 4. The gas connection between the food cavity 10 and the heating cavity is closed. The lunchbox is ready for heating.

FIGS. 21 to 24 show a further embodiment of the lunchbox according to the invention. The switch device has at least one, preferably two or more switch levers 6. As in the previous example, the lid 2 has a downwardly directed outer sealing ring 32 and a likewise downwardly directed inner sealing ring 42. Each of the two sealing rings 32, 42 runs completely circumferentially around the lid 2, their distance from each other and preferably also their distance from the edge of the lid being constant over the entire circumference. The container 4 preferably also has a constant edge, in contrast to the previous example.

The lid 2 is penetrated by at least one, here by two, switch levers 6. The switch levers 6 run between the inner sealing ring 42 and the outer sealing ring 32, as can be seen clearly in FIGS. 21 and 22.

Figure 21:
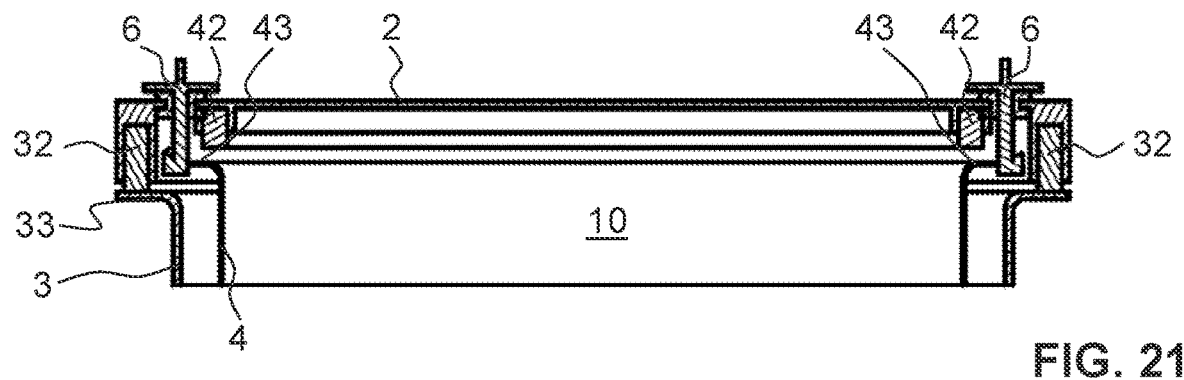
FIG. 21 shows a cross-section through a part of a lunchbox according to the invention in a third embodiment with the gas connection open.
Figure 22:
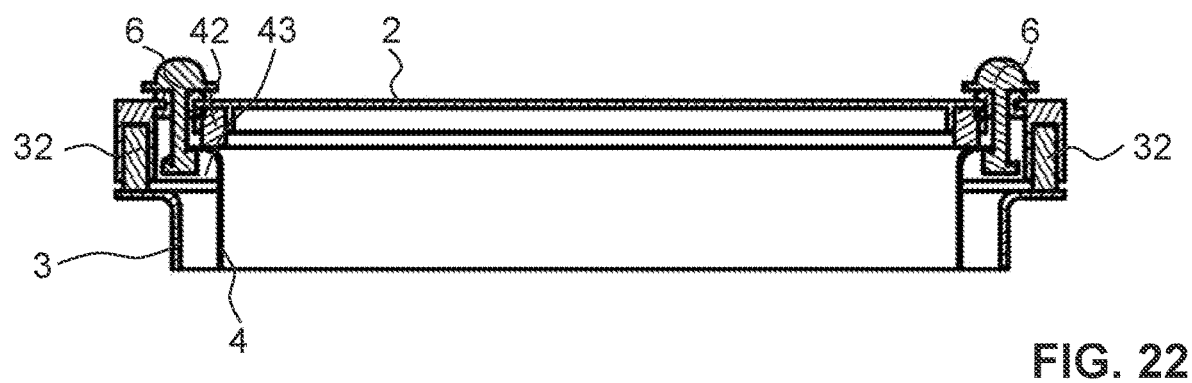
FIG. 22 shows a cross-section through the part of the lunchbox according to FIG. 21 with the gas connection closed.
Figure 23:
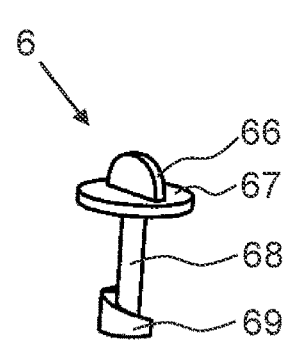
FIG. 23 shows a perspective view of a switch element of the lunchbox according to FIG. 21.
Figure 24:
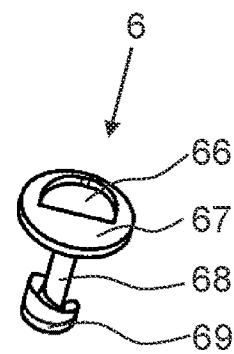
FIG. 24 shows a further perspective view of a switch element of the lunchbox according to FIG. 21.

By changing the position of the switch lever 6, the container 4 can be lifted until its upper edge 43 rests against the inner sealing ring 42 and is thus circumferentially sealed. This lifting closes the gas connection. The open steam position is shown in FIG. 21. The closed heating position is shown in FIG. 22.

The at least one switch lever 6 can be designed differently. Preferably, it can be brought from the steam position to the heating position and vice versa by vertical displacement and/or by a rotary movement, and it lowers and raises the container 4 again as a result of this movement. An example of the control lever 6 can be seen in FIGS. 23 and 24. It has a handle 66 arranged on an upper head 67. The head 67 is arranged on a shaft 68, the free end of which ends in a downwardly sloping slotted guide 69. Turning the handle 66 rotates the slotted guide 69, which is arranged below the upper edge 43 of the container 4. The upper edge 43 is gripped during the rotation and carried upwards.

Figure 25:
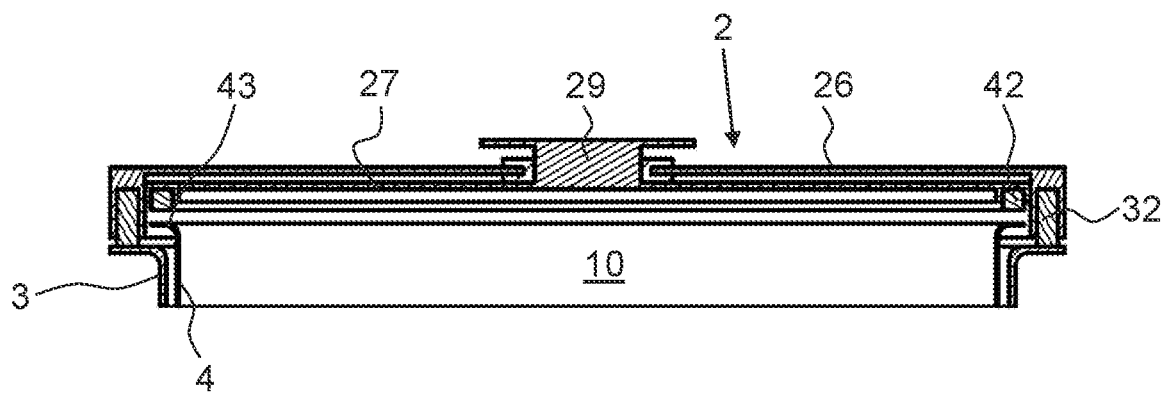
FIG. 25 shows a cross-section through a part of a lunchbox according to the invention in a fourth embodiment with the gas connection open.
Figure 26:
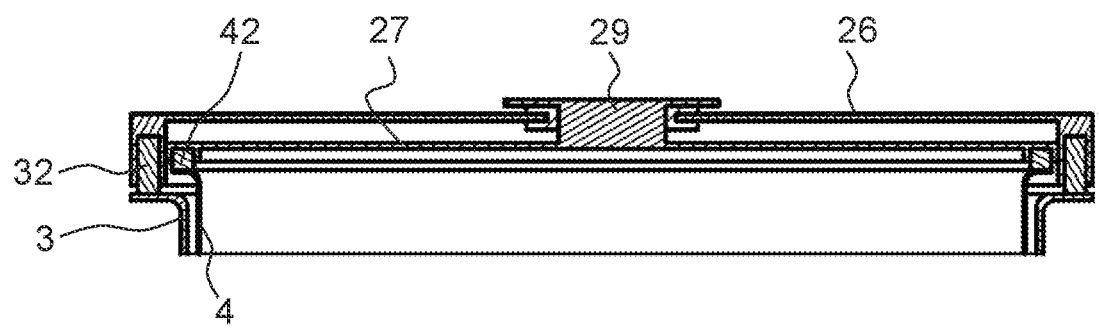
FIG. 26 shows a cross-section through the part of the lunchbox according to FIG. 25 with the gas connection closed.

FIGS. 25 and 26 show another example. Here too, the lid 2 has an inner sealing ring 42 and an outer sealing ring 32, both of which are directed downwardly and rest in a sealing manner on the upper edge 43 of the container 4 and on the upper edge 33 of the base 3 respectively.

They are again completely circumferential and preferably have the same distance from each other over their entire circumference.

In this example, the lid 2 has two layers, with an outer lid plate 26 and an inner lid plate 27. The outer sealing ring 32 is arranged on the outer lid plate 26, the inner sealing ring 42 on the inner lid plate 27. The two plates 26, 27 are arranged so that they can be moved vertically in relation to each other, so that the distance between the inner lid plate 27 and the outer lid plate 26 can be changed.

In a raised switch position, only the outer sealing ring 32 is in circumferential sealing contact with the upper edge 33 of the base. The inner lid plate 27 is raised and the inner sealing ring 42 thus ends at a distance from the upper edge 43 of the container 4. The gas connection is open and the lunchbox is ready for steaming. This can be seen in FIG. 25.

In FIG. 26, the inner lid plate 27 is lowered and the inner sealing ring 42 rests on the upper edge 43 of the container 4 and seals the container interior 10 circumferentially towards the base 3. The gas connection is closed and the lunchbox is ready for heating.

The switch device for shifting the two cover plates 26, 27 can be designed differently. In this example, there is a shifting knob 29 that raises and lowers the inner cover plate 27. Preferably, the position of the shifting knob can be changed in a straight line or via a rotary movement.

Figure 27:
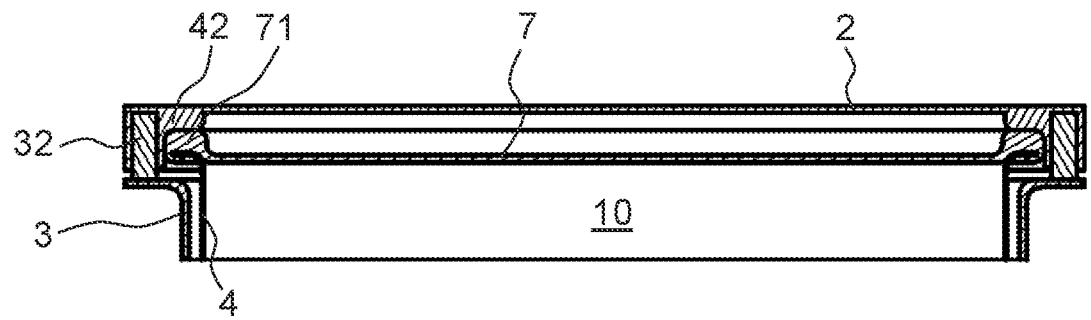
FIG. 27 shows a cross-section through a part of a lunchbox according to the invention in a fifth embodiment with the gas connection closed.
Figure 28:
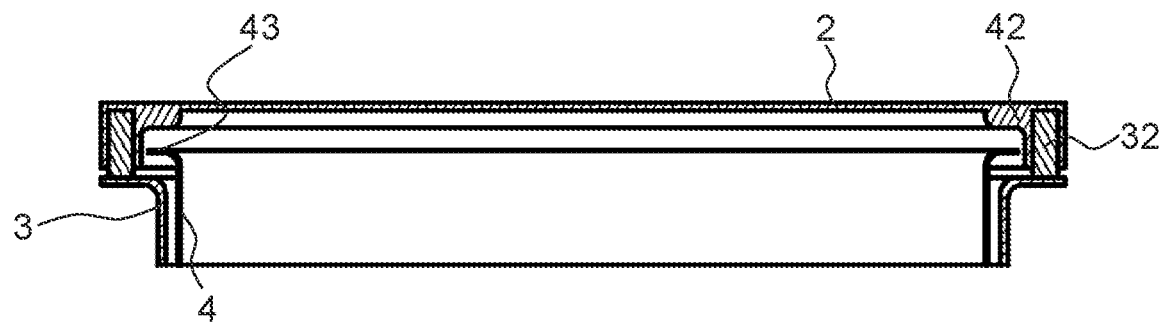
FIG. 28 shows a cross-section through the part of the lunchbox according to FIG. 27 with the gas connection open.

In the embodiment according to FIGS. 27 and 28, the container 4 is tightly closed with a separate container lid 7. A circumferential container sealing ring 71 is arranged on this lid 7 and is directed upwards. Instead of a soft sealing ring 71, there can also simply be a circumferential elevation which forms a sealing seat. Instead of an elevation, the container lid 7 can also simply be sufficiently thick to form a sealing seat. The counterpart to this seal is the downwardly directed inner sealing ring 42, which is arranged on the lid 2. If the container lid 7 has a sealing ring, the lid 2 can also form a suitable sealing seat instead of the inner sealing ring 42.

The lid 2 again has the downwardly directed outer sealing ring 32, which seals the lunchbox tightly with respect to the outside by resting on the upper edge 33 of the base 3 so as to provide a circumferential seal.

In FIG. 27, the container 4 is closed with the container lid 7. There is thus no gas connection to the interior 10. The lunchbox is ready for heating.

In FIG. 28, the container lid 7 is removed and thus the container 4 is open. The gas connection is open and the lunchbox is ready for steaming.

Depending on the embodiment, the container lid 7 is designed to be reusable or is used as a disposable part. The container lid 7 forms the switch device, especially if it is designed to be reusable.

Figure 29:
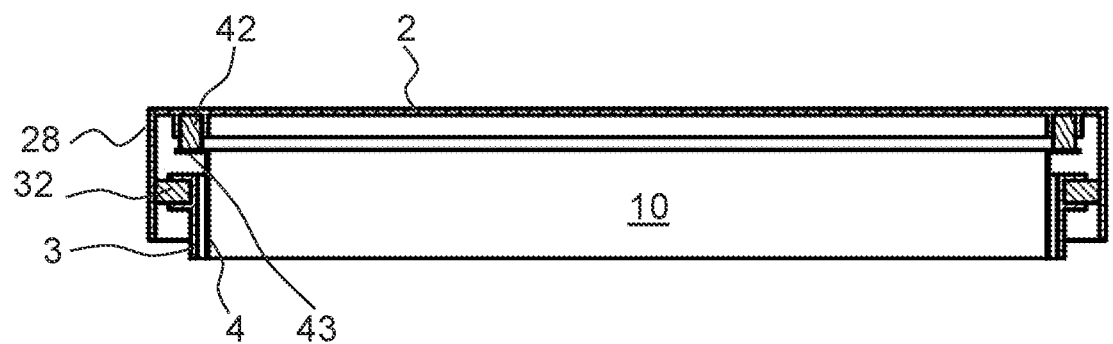
FIG. 29 shows a cross-section through a part of a lunchbox according to the invention in a sixth embodiment with the gas connection closed.
Figure 30:
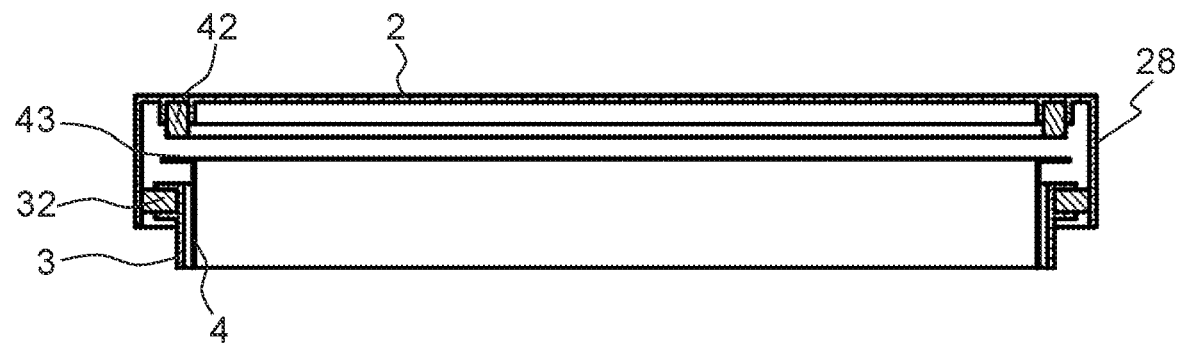
FIG. 30 shows a cross-section through the part of the lunchbox according to FIG. 29 with the gas connection open.

FIGS. 29 and 30 show a further embodiment. The lid 2 has a circumferential, downwardly directed jacket 28. The outer sealing ring 32 is not arranged on the lid 2, but is held or moulded onto a corresponding receptacle on the side walls of the container 3. The jacket 28 covers the outer sealing ring 32 so that the lunchbox is sealed tightly with respect to the outside. The inner sealing ring 42 is still arranged on the lid 2 and projects downwardly. When closed, the inner sealing ring 42 is in sealing contact with the upper edge 43 of the container 4. The gas connection is interrupted and the lunchbox can only be heated. This can be seen in FIG. 29.

When the lid 2 is lifted, the inner sealing ring 32 releases the upper edge 43 of the container 4 and the gas connection is open. The lunchbox can be used for steaming. This can be seen in FIG. 30. The lunchbox is still completely sealed with respect to the outside because the jacket 28 of the lid 2 has been moved along the outer sealing ring 43, but is still in contact with it.

The displacement of the lid 2 can be achieved in different ways. For example, it can be done by hand. However, the upward displacement can also be achieved by means of the steam generated in the device. In both cases, a lock is preferably provided to prevent the lid 2 from being lifted when only the heating function is to be used. The usual clamping means or other known elements can be used as a locking device. Here as well, the switch device is the lid 2 itself.

The lunchbox according to the invention can be formed simply, robustly and inexpensively and it enables various kinds of meals preparation in a simple manner.

The invention claimed is:

1. A portable lunchbox for storing, transporting and preparing food, comprising
a base;
a food cavity for receiving food;
a heating cavity for receiving water and being defined by the base;
a heating element for heating water in the heating cavity; and
a switch device which can be switched from a first state to a second state;
wherein the base surrounds the food cavity and the heating cavity;
wherein the lunchbox is designed:
in the first state of the switch device to heat food arranged in the food cavity, and
in the second state of the switch device to steam food arranged in the food cavity;
wherein the lunchbox, in the first state and the second state, is closed with respect to an outside in a gas-tight and liquid-tight manner;
wherein the switch device:
in the first state closes a gas connection between the heating cavity and the food cavity, and
in a second state, opens the gas connection between the heating cavity and the food cavity.

2. The portable lunchbox according to claim 1, comprising a first seal, wherein
in the first state of the switch device, the first seal seals the food cavity in a gas-tight manner with respect to the heating cavity, and
in the second state of the switch device, the switch device at least partially releases the first seal so that the food cavity and the heating cavity are gas-connected to each other.

3. The portable lunchbox according to claim 2, comprising:
a second seal which, in a closed state of the lunchbox, seals the food cavity with respect to the outside in a gas-tight manner; and
wherein the first seal and the second seal are formed as a single component.

4. The portable lunchbox according to claim 1, comprising a first seal,
wherein in the first state of the switch device, the first seal seals the food cavity in a gas-tight manner with respect to the heating cavity,
wherein in the second state of the switch device, the switch device at least partially releases the first seal so that the food cavity and the heating cavity are gas-connected to each other, and
wherein the first seal comprises a first self-contained sealing ring and the second seal comprises a second self-contained sealing ring, wherein the first sealing ring extends within an area enclosed by the second sealing ring.

5. The portable lunchbox according to claim 4, wherein the first sealing ring has, in at least one region, a distance from an adjacent region of the second sealing ring which is many times greater than regions of the two sealing rings adjacent to this region.

6. The portable lunchbox according to claim 5,
wherein in the region with increased spacing a sealing wing connects the two sealing rings to one another,
wherein the sealing wing is firmly connected to the switch device by means of a connecting element, and
wherein in the second state of the switch device the sealing wing and an associated region of the first sealing ring are raised.

7. The portable lunchbox according to claim 6, wherein in the first state of the switch device the first sealing ring rests over its entire length on a circumferential upper edge of the food cavity.

8. The portable lunchbox according to claim 1,
wherein a lid is provided which sealingly closes a base surrounding the food cavity and the heating cavity, wherein the lid can be placed on the base in two different positions, and
wherein the lid forms the switch device, and wherein a first position of the lid on the base creates the first state and a second position of the lid on the base creates the second state.

9. The portable lunchbox according to claim 1,
wherein a lid is provided, which sealingly closes a base surrounding the food cavity and the heating cavity, and
wherein the switch device changes the position of the lid relative to the base to create the two states.

10. The portable lunchbox according to claim 9, wherein the switch device is manually operable.

11. The portable lunchbox according to claim 9, wherein the switch device is operable by means of a positive pressure created during heating of the water in the lunchbox.

12. The portable lunchbox according to claim 11, wherein at least one fixing means is provided to fix the lid in a position relative to the base.

13. The portable lunchbox according to claim 1 further comprising a wall which moves outwardly during heating of the water and which allows an increase in volume in an interior of the lunchbox when the lunchbox is outwardly sealed.

14. The portable lunchbox according to claim 1, wherein, in a closed state of the lunchbox,
the food cavity;
the heating cavity; and
in the second state of the switch device, the combination of food cavity and heating cavity
is gas- and liquid-tight to the outside.

15. The portable lunchbox according to claim 1, comprising
a lid;
a base; and
a container designed to receive food,
wherein in a closed state of the lunchbox
the container is arranged between the lid and the base.

16. The portable lunchbox according to claim 15, comprising a fastening element which is designed to fasten the lid to the base, and
wherein the fastening element is designed as a switch device.

17. The portable lunchbox according to claim 1, comprising
an air pressure sensor designed to detect an air pressure surrounding the lunchbox;
a first temperature sensor designed to sense a temperature within the heating cavity; and
a control device designed to control a heating power of the heating element in dependence on the data detected by the air pressure sensor and the first temperature sensor.

18. The portable lunchbox according to claim 1, comprising
the heating cavity with a water cavity for receiving water;
the heating element for heating water in the water cavity;
a first temperature sensor designed to detect a temperature inside the heating cavity but outside the water cavity;
a second temperature sensor designed to detect a temperature within the water cavity; and
a control device designed to control a heating power of the heating element in dependence on the data detected by the first and second temperature sensors.

19. A device for preparing food, comprising
a food cavity for receiving food;
a heating cavity for receiving water;
a heating element for heating water in the heating cavity;
at least one air pressure sensor which is designed to detect an external air pressure surrounding the lunchbox;
a first temperature sensor designed to sense a temperature within the heating cavity; and
a control device designed to control a heating power of the heating element in dependence on the data detected by the air pressure sensor and the first temperature sensor.

20. The device according to claim 19, wherein the at least one air pressure sensor is arranged fluidically separately from the food cavity and the heating cavity.

21. A device for preparing food, comprising
a food cavity for receiving food;
a heating cavity with a water cavity for receiving water;
a heating element for heating water in the water cavity;
a first temperature sensor designed to detect a temperature inside the heating cavity but outside the water cavity;
a second temperature sensor designed to detect a temperature inside the water cavity; and
a control device designed to control a heating power of the heating element in dependence on the data detected by the first and second temperature sensors.

22. The device according to claim 21, wherein at least the heating cavity is sealed with respect to the outside by a seal, and wherein the seal opens or leaks at a defined pressure difference between the interior of the heating cavity and the outside.

23. A food unit comprising the container of a portable lunch box according to claim 15 and food arranged therein.

24. The portable lunchbox according to claim 1, comprising a container and wherein the food cavity is defined by the container.

25. The portable lunchbox according to claim 1, comprising a lid, wherein the lid sealingly closes the base.

* * * * *